(12) United States Patent
Horvitz

(10) Patent No.: US 6,182,133 B1
(45) Date of Patent: Jan. 30, 2001

(54) METHOD AND APPARATUS FOR DISPLAY OF INFORMATION PREFETCHING AND CACHE STATUS HAVING VARIABLE VISUAL INDICATION BASED ON A PERIOD OF TIME SINCE PREFETCHING

(75) Inventor: Eric Horvitz, Kirkland, WA (US)

(73) Assignee: Microsoft Corporation, Redmond, WA (US)

(*) Notice: Under 35 U.S.C. 154(b), the term of this patent shall be extended for 0 days.

(21) Appl. No.: 09/019,641

(22) Filed: Feb. 6, 1998

(51) Int. Cl.⁷ ............................. G06F 15/16; G06F 15/173
(52) U.S. Cl. ......................... 709/223; 709/201; 709/203; 709/219; 709/228; 707/8
(58) Field of Search .................................. 709/219, 203, 709/228, 201, 229; 707/8

(56) References Cited

U.S. PATENT DOCUMENTS

| | | | |
|---|---|---|---|
| 5,572,643 | | 11/1996 | Judson .................................. 395/793 |
| 5,727,129 | | 3/1998 | Barrett et al. ........................... 395/12 |
| 5,787,254 | * | 7/1998 | Maddalozzo, Jr. et al. ......... 709/228 |
| 5,802,292 | | 6/1998 | Mogul ............................. 395/200.33 |
| 5,862,325 | * | 1/1999 | Reed et al. ........................... 709/201 |
| 5,878,223 | | 3/1999 | Becker ........................... 395/200.53 |
| 5,897,634 | * | 4/1999 | Attaluri et al. ........................... 707/8 |
| 5,925,100 | * | 7/1999 | Drewry ................................ 709/219 |

OTHER PUBLICATIONS

Z. Jiang et al, "Prefetching Links on the WWW", pp. 483–489 (©1997 IEEE).

C. Cunha et al, "Determining WWW User's Next Access and Its Application to Pre-fetching", pp. 6–11 (©1997 IEEE).

U.S. application No. 09/007,894, Horvitz, filed Jan. 15, 1998.
U.S. application No. 09/007,895, Horvitz, filed Jan. 15, 1998.
U.S. application No. 09/007,900, Altschuler et al., filed Jan. 15, 1998.
U.S. application No. 09/007,901, Altschuler et al., filed Jan. 15, 1998.
U.S. application No. 09/007,902, Altschuler et al., filed Jan. 15, 1998.
U.S. application No. 09/007,898, Altschuler et al., filed Jan. 15, 1998.

* cited by examiner

Primary Examiner—Zarni Maung
Assistant Examiner—Paul Kang
(74) Attorney, Agent, or Firm—Michaelson & Wallace; Peter L. Michaelson

(57) ABSTRACT

A technique, specifically apparatus and accompanying methods for use therein, that, through continual computation, harnesses available computer resources during periods of low processing activity and low network activity, such as idle time, for prefetching, e.g., web pages, or pre-selected portions thereof, into local cache of a client computer. As the browser prefetches and stores each web page (or component thereof) in its local cache, the browser provides a suitable and preferably visual indication, through its graphical user interface, to a user that this item has been fetched and stored. Consequently, the user can quickly and visually perceive that a particular item (i.e., a "fresh" page or portion) has just been prefetched and which (s)he can now quickly access from local cache. As such additional items are cached, the browser can change the color of the displayed hotlink associated with each of the items then stored in cache so as, through color coding, to reflect their relative latency ("aging") in cache.

5 Claims, 21 Drawing Sheets

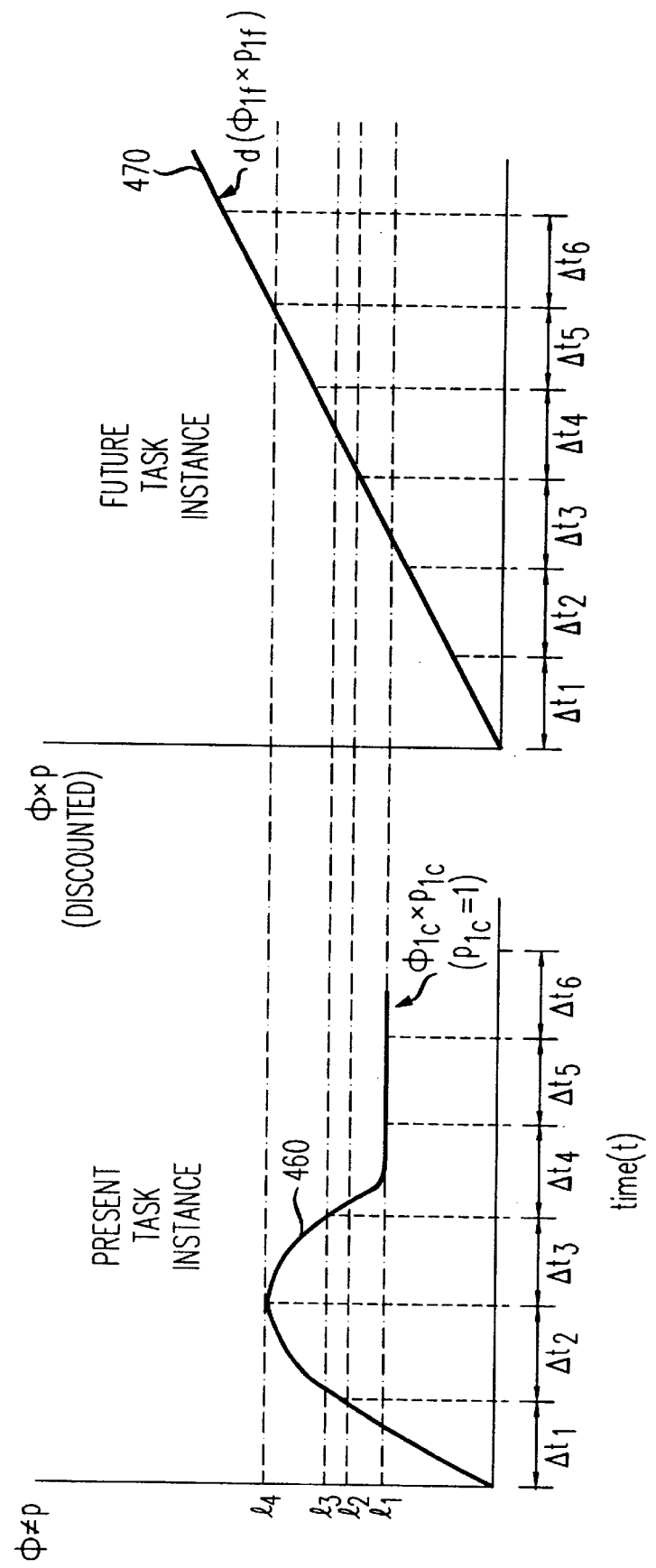
FIG. 4C — PRESENT v. FUTURE TASK (DISCOUNTED)

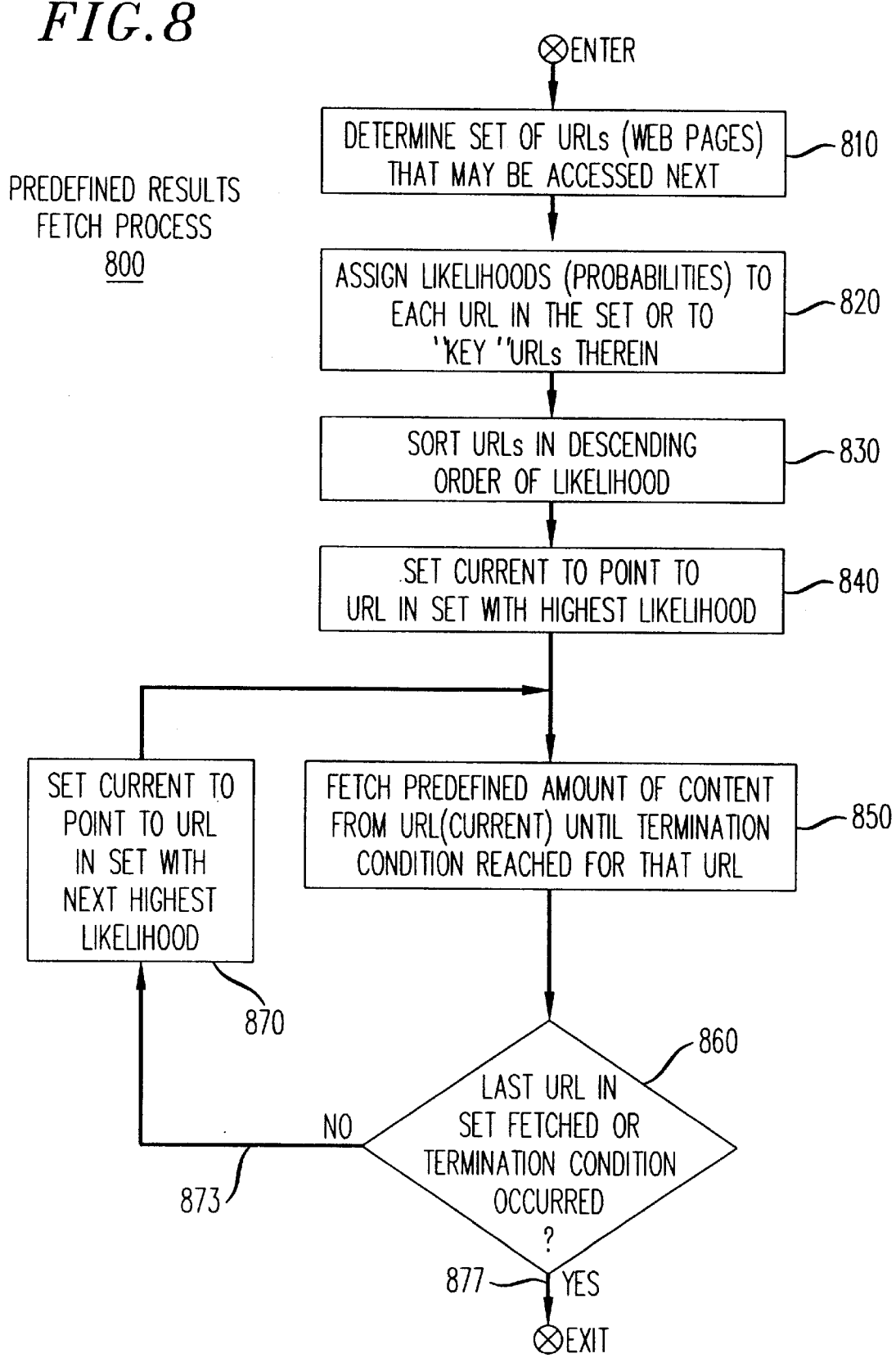

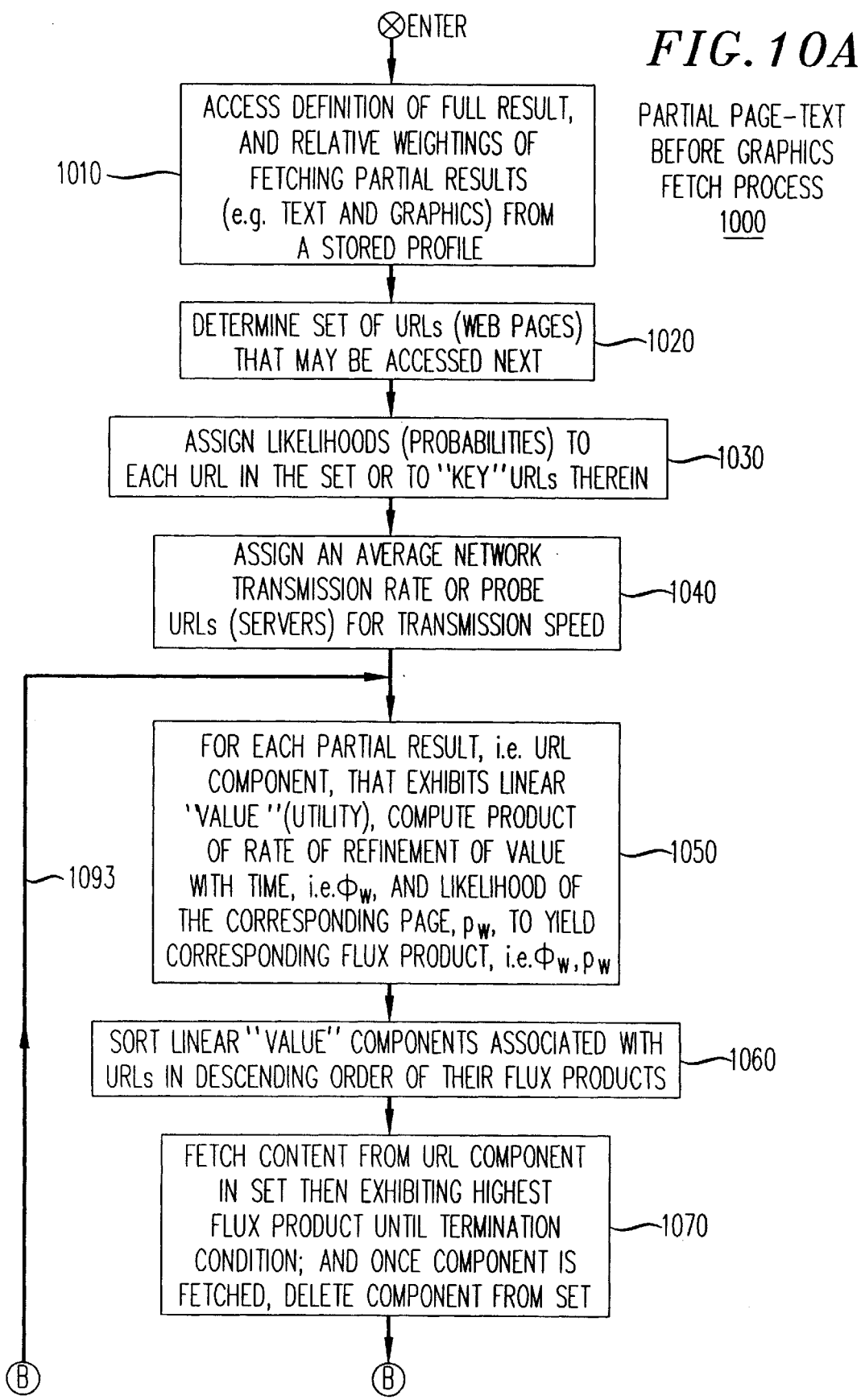

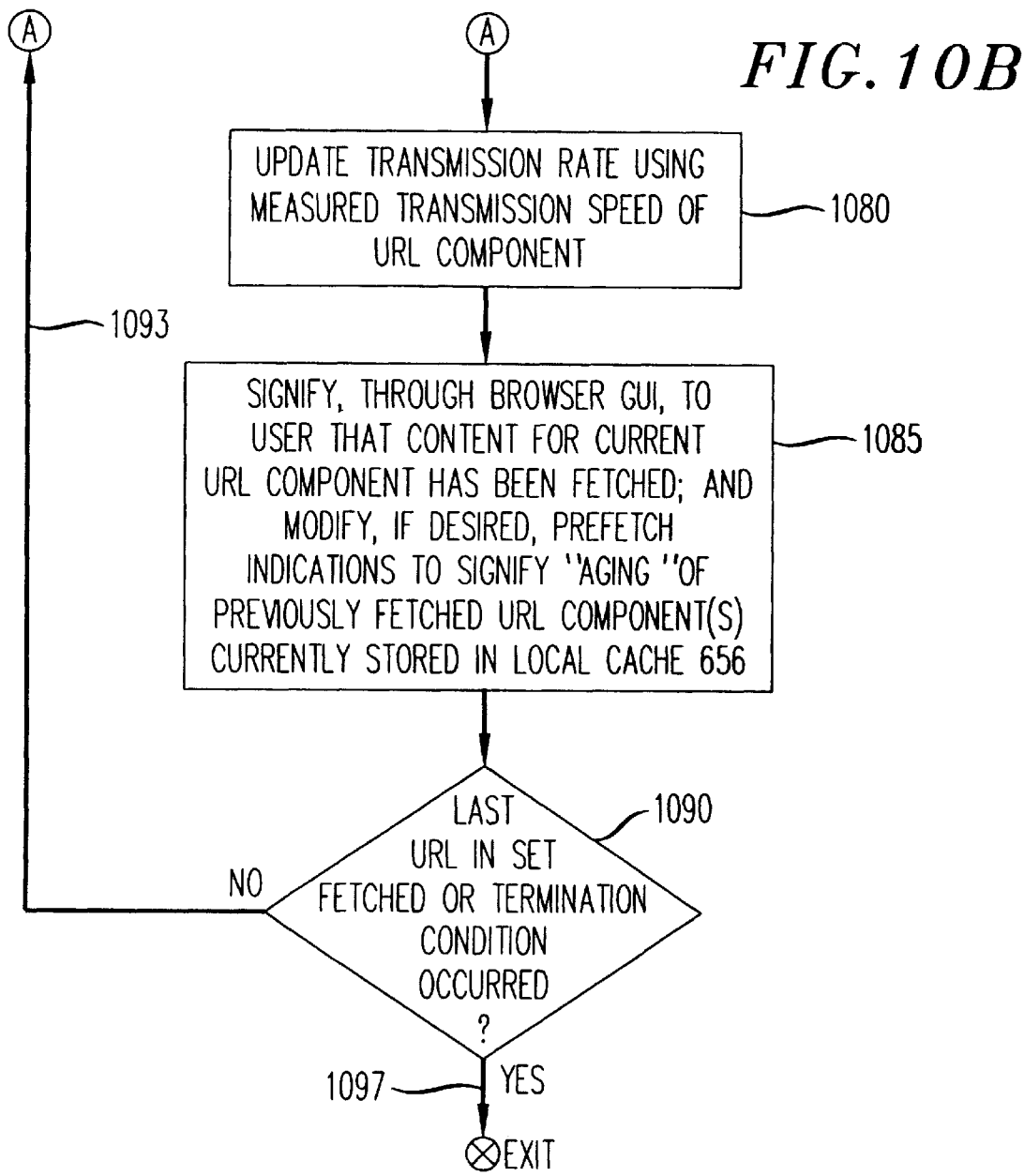

FIG. 11A
PARTIAL PAGE-SCREENFUL
FETCH PROCESS
1100

⊗ ENTER

1110 — ACCESS DEFINITION OF FULL RESULT, AND RELATIVE WEIGHTINGS OF FETCHING PARTIAL RESULTS (e.g. RELATIVE VALUE OF EACH SUCCESSIVE SCREENFUL OF TEXT) FROM A STORED PROFILE

1120 — DETERMINE A SET OF URLs (WEB PAGES) THAT MAY BE ACCESSED NEXT

1130 — ASSIGN LIKELIHOODS (PROBABILITIES) TO EACH URL IN THE SET OR TO "KEY" URLs THEREIN

1140 — ASSIGN AN AVERAGE NETWORK TRANSMISSION RATE OR PROBE URLs (SERVERS) FOR TRANSMISSION SPEED

1150 — FOR EACH PARTIAL RESULT, i.e. URL SCREENFUL, THAT EXHIBITS LINEAR "VALUE" (UTILITY), COMPUTE PRODUCT OF RATE OF REFINEMENT OF VALUE WITH TIME, i.e. $\phi_w$, AND LIKELIHOOD OF THE CORRESPONDING PAGE, $p_w$, TO YIELD CORRESPONDING FLUX PRODUCT, i.e. $\phi_w \cdot p_w$

1160 — SORT LINEAR "VALUE" COMPONENTS (HERE SCREENFULS) ASSOCIATED WITH URLs IN DESCENDING ORDER OF THEIR FLUX PRODUCTS

Ⓑ   Ⓑ

METHOD AND APPARATUS FOR DISPLAY OF INFORMATION PREFETCHING AND CACHE STATUS HAVING VARIABLE VISUAL INDICATION BASED ON A PERIOD OF TIME SINCE PREFETCHING

BACKGROUND OF THE DISCLOSURE

1. Field of the Invention

The invention relates to a technique, specifically apparatus and accompanying methods for use therein, that optimally, through continual computation, uses available computer resources including but not limited to periods of low processing and low network activity, such as idle time, for prefetching web pages, or pre-selected portions thereof, into local cache of a client computer and providing an indication to a user that such pages or portions have been prefetched. This technique, particularly though not exclusively suited for use in a web browser, utilizes, e.g., a probabilistic or statistical user model to specify, at any one time, those pages that are to be prefetched given information including, e.g., a web page currently being rendered to a user, content and structure of that particular web page, a history of web pages visited by the user, user background, and user actions. In addition, advantageously, this technique prematurely terminates a current information download for the user in favor of prefetching a web page of future interest to that user whenever the latter page exhibits greater incremental utility to the user than does continuing the current download.

2. Description of the Prior Art

Currently, Internet usage, and particularly that of the World Wide Web (henceforth referred to as simply the "web"), is growing explosively, particularly as the number of web sites and users that have access to the Internet continues to rapidly expand.

In essence, after establishing a suitable network connection the Internet, a user can easily employ a graphical web browser, such as the Internet Explorer ("IE") browser presently available from Microsoft Corporation of Redmond, Washington, to connect to a web site by simply supplying an address (known as a URL or uniform resource locator). The URL identifies both the location of the site and a page of information at that site. Each web site stores at least one, and often times substantially more pages all arranged in a pre-defined hierarchy. Pages, in this context, refer to content accessed via a URL, including, e.g., text, graphics, and other information. Once a user supplies a URL, the browser sends an appropriate command to the site storing that page to access and download that page; the site then sends a file containing information for that page. As the file is received by the browser, the browser assembles and displays the page on a monitor for the client computer. Once the content associated with the page is fully or sufficiently rendered, the user can then point his(her) mouse to a suitable hypertext link, button or other suitable user input field (whichever here implements a "hotlink") displayed on that page and then, through, e.g., a mouse "click", effectively download and display another desired page in succession until the user has finished his(her) visit to that site. A hotlink specifies an address of an associated page, regardless of the web site at which that page is situated. Consequently, by simply and successively pointing and "clicking" his(her) mouse at an appropriate hotlink for each one of a number of desired web pages, the user can readily retrieve each desired page in succession from its corresponding web site and effortlessly jump from site to site, regardless of where those sites are physically located.

While a considerable amount of information can be downloaded from a web site for display by a browser, in practice, various factors exist which retard the speed at which the content from a page or from successive pages can be displayed on a client computer—often to the frustration of a user situated there.

One such factor lies with the nature of traditional personal computing itself. Specifically, personal computing applications, such as web browsers, word processors and spreadsheets, heavily rely on continual interactivity between the user and the computer. Inasmuch as a human being provides information, i.e., an entry, into a personal computer at a substantially slower rate than a rate at which the computer is able to accept and process the entry, computing activity in a personal computer is typically characterized by bursts of user input associated with relatively high processing or network activity, during which a user entry is being actively processed or information is being communicated, interspersed with intervals, usually considerably much longer, of relatively low activity during which the computer waits for another user entry. Oftentimes, during the latter intervals, relatively low priority tasks, such as background or overhead processing of one form or another, execute or, if no such tasks then exist, the computer simply resides in an idle state pending receipt of a user entry. Hence, some degree of available processing or networking capacity may either exist and not be used by virtue of the computer or network simply idling, or be allocated to relatively unimportant (i.e., low priority) tasks that could readily be deferred so as to allocate computational effort to potential future tasks. In the case of executing a web browser, the amount of time a personal computer and network spends in processing and communicating a user request, such as entry of a URL and fetch and display of content from a web page associated therewith, may be shorter than an interval of time during which a user both examines content or a portion of the content from that page, once displayed, without providing any entry (i.e., "dwells" on the page) and then fully completes or selects a next entry, e.g., by clicking on a next successive hypertext link or button.

Moreover, a conventional web browser and a user collectively and principally operate on a time-staggered basis with no overlap, i.e., they operate serially. operating in this manner, while procedurally rather simple, is rather inefficient and wasteful of processing time. Essentially, while the computer and the browser operate in a high activity state to process user input and, by doing so, fetch a page from a web site and then display that page, the user simply waits until the browser finishes assembling that page on the monitor or attempts to browse portions of a page that have been transmitted and rendered while a download continues. Page assembly completes either when the page is fully assembled and rendered, or when the user prematurely terminates further page assembly by suitably issuing a termination signal to the browser such as a "Stop" or "Back" command. In many situations, a user is only interested in reviewing a portion of total content associated with a URL, often being most interested in representative or overview material which is typically transmitted initially. Commonly, where a user searches for information that may reside on one or several URLs, among scores of potentially valuable pages, the user only spends time reviewing a small portion of content from a URL to decide whether the content associated with that URL is relevant. While the user dwells on content that has already been completely downloaded and displayed, and pending completion of any user input, e.g., while a mouse is being manipulated or data entered through a keyboard, the computer and browser are both operating in a low activity state (the former idling or executing low priority tasks, the latter idling) pending a signal from the user, typically a mouse click, that (s)he has completed entry of that input and requests that the input be suitably processed. In cases where all of the content associated with a URL is not yet downloaded, networking resources may be wasted retrieving additional components of a page that will not provide great value to the user. Thus, processing time may be wasted by the computer and browser in either simply waiting for successive user input once a current page has been assembled and rendered, or by using computer, network, and server resources to continue to retrieve additional information associated with a URL that may be of little or no value to the user.

Hence, in a personal computer environment, one might think that if a personal computer, and specifically a web browser executing there, could utilize available processing capacity that would otherwise be wasted (either by virtue of idling or being allocated to low priority tasks) to process future page requests in some fashion, the throughput of displayed pages could advantageously increase to the benefit of the user. However, the art appears to be devoid of any teachings that dictate just how this could be accomplished.

Therefore, a need exists in the art for a technique, specifically apparatus and accompanying methods, for use with a personal computer, and particularly a web browser executing there, that can process page requests using processing and networking capacity, available during intervals of relatively low activity, such as, e.g., idle CPU or network capacity, that would otherwise be wasted, or for allocating varying amounts of networking resources away from downloading and display of components of a requested URL and in favor of downloading content associated with potential future URL requests. Advantageously, use of such a technique is likely to significantly increase the rate at which pages are typically displayed to a user, thus reducing user frustration and increasing user satisfaction.

SUMMARY OF THE INVENTION

My inventive technique satisfies this need for prefetching and caching web pages (or, generally speaking, information), as determined by a user model, that may be selected in the future by the user or that contain content that may be of interest to the user based upon current and/or, e.g., prior interaction of the user with, e.g., his(her) client computer.

Broadly speaking and in accordance with my invention, a client computer prefetches such web pages of interest (of other information) for subsequent access, potentially while a current web page is being rendered for, e.g., for user review, on a local display.

Advantageously, my inventive technique uses available resources that would otherwise be available during periods of low activity, i.e., during intervals of what otherwise would be periods of low (e.g., idle) processing time (e.g., during which a web page is being displayed) and/or low (e.g., idle) network activity to select, prefetch and cache appropriate pages or selected portions of those pages. Alternatively, such current resources that would be otherwise be applied to continuing to download additional portions associated with a currently selected page can be allocated instead to the task of prefetching and caching pages that may be selected in the future.

Furthermore and in accordance with the broad teachings of my invention, the particular pages or portions of pages (or, generally speaking, items of information or predefined portions of those pages) that are prefetched (referred to as "future" pages) are those which would then provide the highest benefit (expected utility) to a user. These potential future pages are determined by forecasting the behavior of the user under uncertainty with user models, that employ rules, functions, data analysis, or combinations thereof to provide estimates of probabilities (likelihood) that the user will access, in the future, each of those particular pages for viewing, e.g., transition to that page from a current page, or transition to that page later, i.e., in a current session or within a given time horizon of that session. The user models can rely on, e.g., a function(s) of current page structure and content, recent sequences of pages downloaded to the user, descriptions of long-term or short-term interests of the user, user background, the behavior of the user in interacting with the computer or previously downloaded content, and one or more usage statistics available from a server or from the user's computer.

Specifically, once a user, at a client computer, enters an address (e.g., a URL) of a desired web page, a set containing web addresses of pages, that based on the user model are each likely to be accessed next, in the same session, or within a given time horizon thereof by that user, are determined, with corresponding files for those pages prefetched by the client computer during intervals of low processing activity and/or low network activity, or when an incremental rate of change in utility, of continuing current activity is determined to be lower than an expected value of the utility of fetching potential future content. Once prefetched, the file for each page is stored in local cache at the client computer for ready access should the user next select that particular page. As successive web pages are selected by the user and displayed, the immediately prior set of files for prefetched pages can be over-written by files for a current set of prefetched pages. To further improve performance, the files for those web pages that are common to both sets, once prefetched and stored for the prior set, need not be prefetched again as part of the current set. For a given user, the user model can be, e.g., a simple rank ordering of URLs based on log data of page transitions across all individuals who visit a given web site containing those pages or a Bayesian model of the preferences of that user encoded in terms of, e.g., numeric conditional probabilities, of selecting, e.g., given a displayed page, other pages. This model can reside in a web server, a client or across both.

Apart from choosing different web page components, e.g., textual or graphics or individual screenfuls of a common page, to prefetch, on a fundamental level, my present invention also encompasses the concept of prematurely terminating a current information download, in favor of prefetching a web page that will be accessed in the future, such as during the current session or within a given time horizon, where the expected refinement in the rate of change in utility (incremental utility) to the user in prefetching the future page is greater than the incremental utility associated with continuing the current information download. Proceeding in this fashion advantageously permits a browser to terminate an information download which provides diminishing utility to a user in favor of then fetching or prefetching a different page of greater interest.

In accordance with these inventive teachings, a browser, through use of, e.g., a probabilistic user model, can compare rate of refinement in utility provided by a current information download, i.e., a web page currently being fetched, and compare that rate against a discounted flux-product associated with a web page to which the user is likely to transition in the future (i.e., a "future" web page). Whenever the discounted flux-product of the latter page exceeds the rate of refinement with time then being provided by continuing to download the former page, computational or networking resources are deallocated from the current information download and allocated (applied) to prefetching and storing the future web page. Consequently, downloading of the current information is prematurely terminated or slowed (retarded) in favor of then prefetching the future web page. Generally speaking, any current computational task, not just fetching and rendering of web pages, which can be interrupted and for which a rate of refinement in value with time can be ascertained can be prematurely terminated or slowed in accordance with my inventive teachings in favor of prefetching a future web page that, for the user, then exhibits a greater discounted flux-product than does the rate of refinement in value with time of the current task.

Additionally through my inventive teachings, as soon as the browser prefetches and stores each web page (or component thereof) in its local cache, the browser can provide a suitable and preferably visual indication, through its graphical user interface (GUI), to a user that this page (or component) has been fetched and stored. As a result, the user can quickly perceive the particular item (i.e., a "fresh" page or portion) that has just been prefetched and which (s)he can now quickly access. Such an indication may illustratively include: changing a color of a hypertext link (hotlink) displayed by the browser and associated with the page (or component); underlining the hotlink; changing a font, by size and/or type, or other formatting attribute with which the hotlink is depicted; or, generally speaking, any visual feature, attribute or visual cue that can distinguish this hotlink from another that is presently being displayed or signify the status of this hotlink as being prefetched, and, by so doing, attract the attention of the user and/or inform the user. Moreover, as additional pages (or portions) are cached, the browser can further change the displayed hotlinks associated with each such page (or portion) to reflect "aging" of each of these items then stored in cache—effectively color coding the prefetched items by their relative latency. For example, on the one hand, a hotlink could be displayed in red or with a red background to denote that its corresponding page (or portion) has just been fetched and stored, i.e., this item is the most recent addition to the cache. Blue, on the other hand, could be used by the browser to denote a page (or portion) that, relative to all other pages (or portions) then stored in cache, is the "oldest" item in cache. Discrete color hues between red and blue, or a continuous range of hues could be used, with appropriate scaling of hue to latency time, to indicate the relative "age" of separate items then stored in the cache. As each new item is prefetched and stored in the cache, the color coding associated with the items already existing in the cache would be changed accordingly to reflect their increased latency. If any such prefetched item then stored in cache is not accessed by the user after a certain maximum time, such as a few minutes or less, that item can then be automatically purged from the cache in order to free storage space for items to be subsequently prefetched and stored. All such items that have been so purged would no longer be depicted by the browser with any visually distinguishing attribute.

As a feature, my invention can take account of increased information content and importance to a user of separate portions of a common web page, or of different portions of differing pages. In particular, and for a common page, one portion of that page, such as text, might present increased utility to a user over another such portion, e.g., graphics, of that same page. Specifically, if incremental benefit to the user, of prefetching, diminishes with each additional portion of a web page being prefetched, each such remaining portion need not be prefetched in favor of prefetching another page(s) or portion(s) thereof that is likely to provide increased incremental benefit to the user. The incremental benefit of any such portion would be measured by its corresponding flux-product (or discounted flux-product). Those page portions would be prefetched in order of their associated flux-products (or discounted flux-products). In some instances, portions of different web pages, given values of their respective flux-products (or discounted flux-products), may be successively prefetched in lieu of prefetching full pages. The incremental benefit of prefetching each such page or portion thereof can be adjusted downward to account for the cost(s) inherent with its prefetching.

BRIEF DESCRIPTION OF THE DRAWINGS

The teachings of the present invention can be readily understood by considering the following detailed description in conjunction with the accompanying drawings, in which:

FIG. 4C graphically depicts illustrative non-linearly varying $\phi \times p$ curve 460 for a currently executing task instance and illustrative linearly varying discounted $\phi \times p$ curve 470 associated with a future task instance, along with corresponding time intervals and values thereat for comparing, on a successive time-slice basis, value of the currently executing task instance vs. discounted $\phi \times p$ of the future task instance;

FIG. 8 depicts Predefined Results Fetch Process 800 which is performed by browser 35 to implement a page-based URL retrieval strategy in accordance with my inventive teachings;

FIGS. 10A and 10B collectively depict a flowchart of Partial Page—Text before Graphics Fetch Process 1000 which is performed by browser 35 to implement a different retrieval URL retrieval strategy in accordance with my inventive teachings, i.e., fetching text first in favor of graphics from a common web page;

FIGS. 11A and 11B collectively depict a flowchart of Partial Page—Screenful Fetch Process 1100 which is performed by browser 35 to implement another retrieval URL retrieval strategy in accordance with my inventive teachings, i.e., fetching ordered screenfuls of content;

To facilitate understanding, identical reference numerals have been used, where possible, to designate identical elements that are common to the figures.

DETAILED DESCRIPTION

After considering the following description, those skilled in the art will clearly realize that the teachings of my present invention can be utilized in substantially any browser, whether it be for use with, e.g., an Internet, intra-net or other network environment, or even a non-networked environment. My invention is also applicable for use with substantially any information retrieval application to increase throughput, regardless of whether that application retrieves information from an external source, e.g., a networked file server or a locally situated dataset, such as a CD-ROM based dataset, or integrated into an operating system to examine local resources, e.g., files, on a computer. Essentially, the present invention relies on allocating, within a computer system, presently available computer resources, such as currently available processing capacity, to prefetching information, such as, e.g., files for web pages (or portions thereof), that is expected to provide the highest expected utility to a current user of that system and providing an indication, preferably visual in nature, to a user that each such page (or portion) has been prefetched. To further simplify this discussion, I will describe my invention in the context of its use in accessing web pages through an Internet connection.

Figure 1:
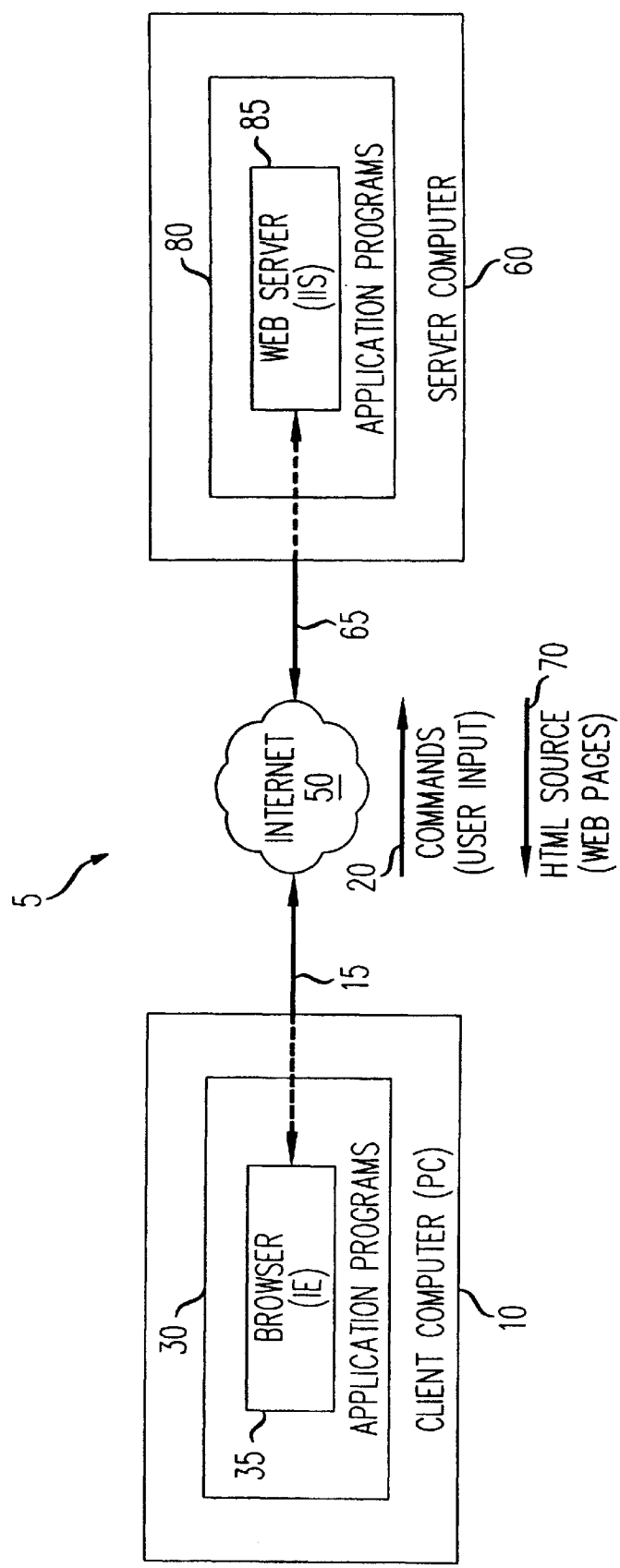
FIG. 1 depicts a high-level block diagram of a typical networked Internet connection 5.

FIG. 1 depicts a high-level block diagram of typical networked Internet connection 5. This connection is formed of client computer 10, here shown as illustratively a personal computer (PC), electrically connected in bi-directional fashion, through links 15 and 65, via network 50 (here the Internet), to remote server computer 60. Web browser 35, typified by the Internet Explorer ("IE") version 4 browser (currently available from Microsoft Corporation of Redmond, Wash.), generally forms part of application programs 30 that are collectively stored within client computer 10 and locally executed. Web server 85, typified by the Internet Information Server (IIS) web server (which is also currently available from Microsoft Corporation), forms part of application programs 80 that are collectively stored and execute within server computer 60.

Once such a networked connection has been established between client computer 10 and server computer 60, a user stationed at the client computer can access a desired web page by supplying the browser with a corresponding web address (in the form of a uniform resource locator—URL) for that page. The term "page", in this context, refers to content accessed, via a URL, including, e.g., text, graphics and other information. The address can be supplied through any of various ways, which illustratively include: direct keyboard entry by the user; selection amongst a stored list of addresses, i.e., so-called "bookmarks"; or "clicking", such as through appropriate manipulation of a mouse, on an appropriate hotlink, for that address, then appearing on a browser control bar, or a home or other web page currently being displayed by the browser. In essence, once a user has supplied his(her) complete input to the browser, through whatever method the user chooses, the browser then sends appropriate commands, as symbolized by line 20, to server 60 to effectuate this user input, such as to retrieve a stored file for a web page for which the user has then supplied an address. In response, web server 85, executing within server computer 60, receives and processes these commands to download a corresponding file, oftentimes in hypertext markup language (HTML) source form, as symbolized by line 70, to the client computer. Upon receipt of this file, browser 35 appropriately processes the HTML source file to properly assemble and then render a web page, represented by this file, on a local display (not specifically shown in FIG. 1). The user, in turn, examines this page. Once the display is fully rendered or the user has instructed the browser to stop rendering the page via an explicit stop command or a click on a hotlink already rendered, the user can then enter a new web address, either using, e.g., any of the hotlinks then appearing on the page, or through selection amongst the then stored bookmarks or direct keyboard entry. Accordingly, the user transitions among successive web pages during a common web session. Thus, by simply and successively pointing and "clicking" his(her) mouse at, e.g., an appropriate hotlink for each one of a number of desired web pages, the user can readily retrieve each desired page, typically a file, in succession from its corresponding web site and effortlessly jump from site to site, regardless of where those sites, e.g., such as that of server 60, are physically located.

Unfortunately, a conventional client computer often displays successive pages rather slowly—generally to the frustration of a user situated thereat.

In accordance with my invention, I have recognized that the speed at which web pages can be displayed (the term "rendered" also being synonymously used herein) can be significantly increased, on average, by harnessing available computer resources at a client computer, during periods of low processing activity when processing capacity would otherwise be wasted, such as during idle processing time, and network resources available during periods of low network activity, to prefetch and store web pages for subsequent access. Also, through my invention, the user is provided with an indication, preferably visual and through a graphical user interface (GUI) generated by, e.g., the browser, for each such page that has been prefetched. Accordingly, the user can quickly perceive that content for the page resides in local storage and, if the user wants to see the page, its content can be very quickly displayed—with substantially less latency than if the page was not prefetched at all. The particular pages that are prefetched are determined through a user model as being those, given a page which a user is currently viewing or a sequence of pages visited, would provide the largest benefit, in terms of, e.g., expected utility, to that user. In that regard, the model provides a URL for each page in a set of pages and a corresponding estimate of the likelihood that, during a current session, a user will access each of those particular pages for viewing, e.g., transition to that page from a current page. While HTML source files are downloaded and processed by browser 35 for a particular web page, the browser partially renders the page with increasing amounts of content being made available for review by the user, until such time as all the required HTML source code files for that page have been fetched and processed by the browser—at which point the page is fully rendered. Hence, the term "rendering" specifically encompasses both partial and complete display of a web page.

Specifically, once a user, at a client computer, enters an address (e.g., a URL) of a desired web page, a set containing web addresses of pages, that based on the user model are each likely to be accessed in the future but during the current session or within a given time horizon by that user, are determined, with corresponding files therefor prefetched by the client computer either: (a) during intervals of low processing activity and/or low network activity, or (b) when the value of prefetching such pages that may be requested in the future exceeds that of continuing to download content from a page then being fetched. Once prefetched, the file for each page is stored in local cache at the client computer, such as computer 10, for ready access should the user next select that particular page. As successive web pages are selected by the user and displayed, the user model is updated through consideration of the current page; thereafter, new pages may be prefetched and so on. When limits are reached in local memory, based on memory allocated for prefetching, content cached through earlier prefetching can be over-written by files for a current set of prefetched pages, where the least valuable pages are targeted for replacement. Depending upon the specific user model used (such models being discussed in considerable detail below), a model can reside within browser 35 or within web server 85.

Additionally through my inventive teachings, as soon as the browser prefetches and stores each web page (or component thereof) in its local cache, the browser can provide a suitable and preferably visual indication, through its graphical user interface (GUI), to a user that this page (or component) has been fetched and stored. As a result, the user can quickly perceive the particular item (i.e., a "fresh" page or portion) that has just been prefetched and which (s)he can now quickly access. Such an indication may illustratively include: changing a color of a hypertext link (hotlink) displayed by the browser and associated with the page (or component); underlining the hotlink; changing a font, by size and/or type, or other formatting attribute with which the hotlink is depicted; or, generally speaking, any visual feature, attribute or visual cue that can distinguish this hotlink from another that is presently being displayed or signify the status of this hotlink as being prefetched, and, by so doing, attract the attention of the user and/or inform the user. Moreover, as additional pages (or portions) are cached, the browser can further change the displayed hotlinks associated with each such page (or portion) to reflect "aging" of each of these items then stored in cache—effectively color coding the prefetched items by their relative latency. For example, on the one hand, a hotlink could be displayed in red or with a red background to denote that its corresponding page (or portion) has just been fetched and stored, i.e., this item is the most recent addition to the cache. Blue, on the other hand, could be used by the browser to denote a page (or portion) that, relative to all other pages (or portions) then stored in cache, is the "oldest" item in cache. Discrete color hues between red and blue, or a continuous range of hues could be used, with appropriate scaling of hue to latency time, to indicate the relative "age" of separate items then stored in the cache. As each new item is prefetched and stored in the cache, the color coding associated with the items already existing in the cache would be changed accordingly to reflect their increased latency. If any such prefetched item then stored in cache is not accessed by the user after a certain maximum time, such as a few minutes or less, that item can then be automatically purged from the cache in order to free storage space for items to be subsequently prefetched and stored. All such items that have been so purged would no longer be depicted by the browser with any visually distinguishing attribute.

The existence of a prefetched page can also be indicated by the browser by a new entry, such as a URL or page title, in a pop-up or pull-down list of prefetched cached items— with the entry being appropriately colored or not, if desired, to reflect its relative latency. In that regard, the browser could display a status icon, at an appropriate location on the GUI, to indicate that prefetching is occurring in order to appropriately inform the user. The user, seeing this icon, could then, through, e.g., suitable manipulation and "clicks" of a mouse manually access the pull-down list to examine the current contents of the cache and then select any desired item therein for display. The contents of this list could be sorted by the browser, in a predefined fashion as defined by the user, based on their corresponding latencies, with, e.g., in ascending or descending order by latency.

To facilitate reader understanding, I will first discuss typical atomistic processing that often occurs within a personal computer and which gives rise to intervals of low processing activity including idle time. I will then discuss how this idle time can be allocated in general to pre-computing available task instances, regardless of what those task instances are, in order to increase processing throughput. Next, I will discuss how precomputation can be done in the absence of intervals of low processing activity, namely by making computation or network resources available through reducing the allocation of such resources to a current task in favor of a potential future task. In this context, I will address two different scenarios. Since these scenarios and the underlying foundational concept of precomputation are all independent of the particular application for which the task instances are executed or even the specific nature of the tasks themselves, for simplification, this discussion will purposely omit these aspects. These two scenarios involve pre-computing, during a current interval of time, a task instance, from a group of instances that are likely to be executed in the future, and which possess either of the following characteristics: (a) fixed utility values associated with the computation or transmission of a specific result, or (b) time-varying utility values associated with refining completeness of a result with ongoing computation or transmission of information over a network.

With that foundation in mind, I will then turn to discussing my present invention as to how precomputation can be used in a client computer, such as computer 10, in order to properly prefetch and store, during intervals of low processing and low network activity, such as idle time, web pages or portions thereof in order to significantly increase throughput of displayed pages. I will also discuss how my inventive teachings can apply even in situations where there is no idle time, by slowing or ceasing network activity associated with a current task and re-allocating the networking resources to the task of prefetching potential future information of interest. This particular discussion will address salient aspects of both hardware and software needed to implement my present invention.

A. Conventional atomistic task processing

Conventional central processing unit (CPU) utilization, on an atomistic level, is often marked by short periods (e.g., bursts) of relatively high processing activity separated by periods, often longer, of relatively low processing activity, typically idle time. This phenomena is graphically depicted by curve 105 shown in diagram 100 of FIG. 2. This curve is typical of that generated for depicting real-time CPU utilization by a CPU usage history monitor feature selectable for display through a Task Manager process in the WINDOWS NT version 4 workstation operating system; this operating system is currently available from Microsoft Corporation of Redmond, Washington (which also owns the registered trademark WINDOWS NT). Curve 100 illustratively contains three intervals of relatively high CPU activity, $105_2$, $105_4$ and $105_6$ (occurring during respective periods $t_2$, $t_4$ and $t_6$) during which task instances A, B and C respectively execute. These intervals are separated by interspersed idle-time intervals $105_1$, $105_3$ and $105_5$ (also denoted as periods $t_1$, $t_3$ and $t_5$, respectively). During each of these three idle-time intervals, a CPU is usually waiting for some other device, typically slower in speed than the CPU, to become available such that the CPU can resume its processing activity by utilizing that device, or data then available therefrom, in some fashion. The processing load that occurs during each of these idle-time intervals is relatively low, here depicted by illustratively 10% CPU utilization. In contrast, bursts $105_2$ and $105_6$, at least for part of their duration, fully utilize the CPU, i.e., to 100% of its processing capacity thereof; while burst $105_4$ illustratively does not.

Given the processing capacity that is available, but heretofore generally unused and thus wasted during each idle-time interval, increased system throughput could be had if a useful task(s) could be processed during each of these intervals.

B. Task selection algorithms for yielding optimal resource utilization

Advantageously, a task instance is selected at a beginning of each of these idle-time intervals and processed during the remainder of that interval. The selected instance is one that is most likely to occur in the near-future and will be precomputed, during an associated idle-time interval, to the extent of the remaining time available during that interval. Once this task instance has been precomputed, its results, partial if the task has not completed prior to the end of the interval, are stored for subsequent access and use. Ideally, by having these results precomputed and ready for future use, future response time, i.e., run-time delay, is appreciably shortened since that task instance, when it would otherwise be dispatched for execution, will have already executed—fully or at least partially. In this manner, available computer resources, here processing time, are maintained at relatively high usage during all time periods, rather than experiencing bursty usage patterns as conventionally occurs; hence, significantly enhancing overall system throughput.

Figure 2:
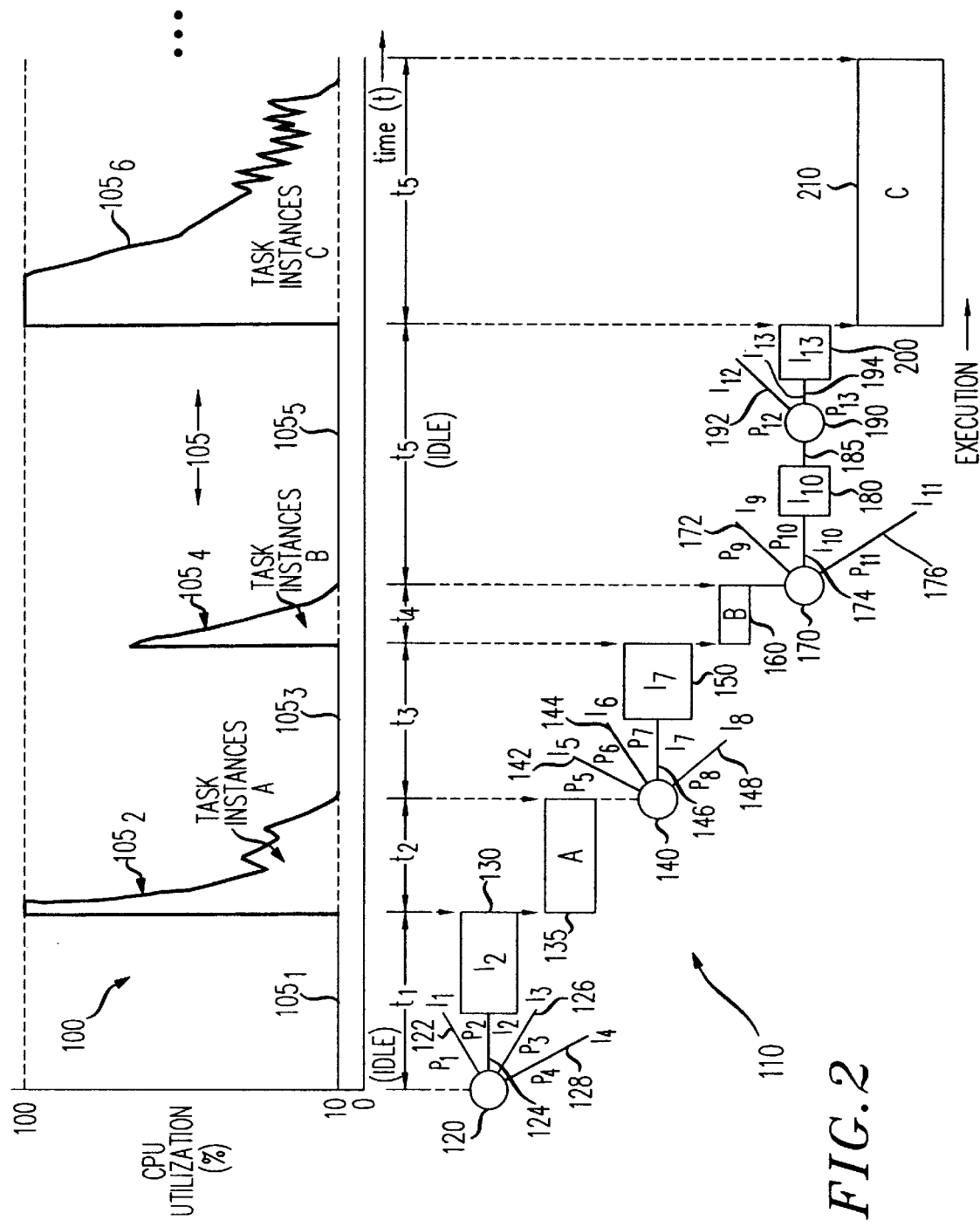
FIG. 2 depicts conventional CPU utilization diagram 100 and corresponding illustrative task chart 110, the latter showing task execution that could effectively utilize idle-time intervals shown in diagram 100.

In that regard, consider task chart 110, depicted in FIG. 2, which shows task execution that could illustratively occur to utilize idle-time intervals, such as those shown in diagram 100. Rather than merely waiting during each idle-time interval, the operating system, during the onset of that period, probabilistically analyzes future task instances to select a given task for precomputation. That instance is then processed to the extent of the available time remaining during that interval. For example, assume at the onset of idle-time interval $105_1$, a group of four unexecuted task instances $I_1$, $I_2$, $I_3$ and $I_4$ are likely to be invoked at some point in the near future. These tasks, viewed collectively, could be a portion of one or more application programs then executing, such as, e.g., a file save task, a file read task, a file download task, a format task or a spreadsheet rotate task.

Particularly in a personal computer processing environment, application based tasks are highly user dependent, in that each such task instance has an associated probability (likelihood) of being invoked by the user at a given time. For any such task instance, this probability accounts for a user not invoking that task at all and if the task is to be invoked, when, relative to a current time, that task is to be invoked. Those task instances with a higher probability are more likely to be invoked sooner than those tasks with a lower probability. Here, illustrative task instances $I_1$, $I_2$, $I_3$ and $I_4$ correspondingly carry, as symbolized by lines 122, 124, 126 and 128 corresponding probabilities $p_1$, $p_2$, $p_3$ and $p_4$ of future execution. Ignore for the moment just how these probabilities are determined; that will be shortly addressed below through two different scenarios. For the four available task instances and at the onset of idle-time interval $t_1$, operation 120 compares the corresponding four probability measures and selects that task instance, here $I_2$, then having the highest probability, $p_2$, of future execution. Once this task is selected, the operating system then executes this task, as symbolized by block 130, throughout the remainder of this idle-time interval.

Enhanced performance and throughput results if the selected task is executed to the fullest extent of the available time during this idle-time interval rather than being prematurely terminated in favor of another task. Use of a conventional time-sharing approach, under which an equal amount of time is allocated to each task instance in a group, would likely result in a sub-optimal allocation of available processing time.

Should idle-time interval $t_1$ elapse prior to completion of task instance $I_2$, this instance then halts, with partial results stored in memory, in favor of task instances A being executed, as symbolized by block 135, during the following high activity period, i.e., burst 105₂. Similarly, at the onset of the next idle-time interval $t_3$, the operating system will select, as symbolized by operation 140, a task instance, from those future task instances then available, which has the highest probability associated with these instances, here illustratively task instance $I_7$ from a group then consisting of illustratively task instances $I_5$, $I_6$, $I_7$ and $I_8$ carrying associated probability measures $p_5$, $p_6$, $p_7$ and $p_8$, as symbolized by lines 142, 144, 146 and 148, respectively. Task instance $I_7$ then executes, as symbolized by block 150, to the extent of the available time remaining during idle-time interval $t_3$. Based on the probabilities of all future task instances, the task instance, here interval $I_7$, that is executed during an idle-time interval may not necessarily be the task instance, e.g., instance $I_2$, that was only partially executed during the most recent idle-time interval. Immediately thereafter during high activity period $t_4$ (burst 105₄), task instances B execute, as symbolized by block 160.

If, however, sufficient time remains during any such idle-time interval, then another probabilistic based assessment is made to select a future task instance from among those then available for precomputation and that particular task instance is executed to the extent of the remaining time, and so forth until that interval elapses. In that regard, at the onset of idle-time interval $t_5$, operation 170 assesses probability measures, $p_9$, $p_{10}$ and $p_{11}$ carried, as represented by lines 172, 174 and 176, by a group of future task instances $I_9$, $I_{10}$ and $I_{11}$, respectively. The task instance in this group then having the highest measure, here illustratively task instance $I_{10}$, then executes, as symbolized by block 180. Since this task instance completes prior to the end of idle-time interval $t_5$, probability measures, $p_{12}$ and $p_{13}$, of a group of future task instances, then available for precomputation, here containing task instances $I_{12}$ and $I_{13}$, are assessed, as symbolized by operation 190, with one of these tasks having the then highest measure, here instance $I_{13}$, being selected. As symbolized by block 200, this instance then executes to the extent of the remaining time left in this idle-time interval. At the conclusion of idle-time interval $t_6$, task instances C execute during ensuing high activity period $t_6$ (burst 105₆), as symbolized by block 210, and so forth.

As noted above, two different scenarios (characteristics) can arise during which task instances can be properly selected for precomputation during idle-time or other periods of low processing activity: those future task instances that are worth some specific amount of, e.g., constant, value over time, following the completion of the current task and those future task instances that exhibit time-varying value with ongoing refinement or transmission of a partial result. Though individually any task instance within a group of future task instances can exhibit either of these two value-based characteristics, for simplicity, I will separately address each of these characteristics and the decisional analysis used to select a future task instance from among a group of such instances having the same characteristic. Inasmuch as those skilled in the art will surely realize that the analysis, regardless of the modality used, reduces to a probability-based measure, these different modalities, depending upon the characteristics of the tasks in a given group, can be combined as needed during the onset of any idle-time interval to select an appropriate task instance, presently executing or future, from amongst those in the group, for current or continued execution, respectively.

1. task instances exhibiting constant value over time

Some task instances provide a fixed value (utility) with their completion that does not vary with time. The value may be known quantitatively or at least qualitatively. The value can be used to prioritize operations. For example, in a database application, a file save operation takes precedence over exiting the database program or even changing an existing entry or creating a new record if the database is open; the simple reason being to preserve the current data then resident in the database. Other tasks, such as changing a background color of a display, would clearly be of much lesser importance. As such, certain tasks can be ranked in terms of their future importance, which may include, e.g., their fixed value, their future costs, such as for delayed future availability of results from those tasks, or at least qualitative importance to a user. Task instances that possess a higher future importance, e.g., value, quantitatively or qualitatively, would simply be ranked ahead of those exhibiting lesser importance.

Within a given group of future task instances available at the onset of an idle-time interval wherein each of these instances possesses either a fixed value or qualitative ranking in terms of its importance vis-à-vis other such task instances, the task instance that then possesses the highest value or importance (quantitatively or qualitatively) would be selected and executed first during that interval—that instance is the one then providing the highest current utility. That instance would then be removed from further consideration. The remaining future task instances in a group would be re-evaluated at the onset of each successive idle-time interval to select the next task instance, from the group as it then exists, which would then be most appropriate for precomputation. Should additional time remain during any such interval, then the future task instances then existing would re-evaluated for possible precomputation during the remainder of that interval. Should the ranking reveal two (or more) task instances that then possess the same highest equal value or importance, then any of these particular task instances could be selected, on an indifferent basis, and be subjected to any portion of the available time for precomputation during an associated idle-time interval. The time available could be applied to any of the tasks in any proportion until all of the tasks are completed or this time becomes unavailable or ceases.

Specifically, expected delay at run-time associated with, e.g., precomputing a task instance is a function of the actions the system takes to precompute answers to challenges faced by that instance and the duration of an idle-time interval during which such precomputation is to occur. Here, a goal is to minimize run-time delay.

Time parameter, $t(I_i)$, represents time required to completely solve task instance $I_i$. Parameter T represents total time available during an idle-time interval with $t_i^f$ representing a fraction of available idle-time allocated to precomputing instance $I_i$ ahead of time. The total usable idle time T is less than or equal to the maximal exploitable idle time, $T_m$, during any one idle-time interval and sufficient to execute all potential future task instances, which is given by equation (1) as follows:

$$T_m = \sum_i t(I_i). \tag{1}$$

With these terms defined as such, the expected run-time delay before completing execution of a future task instance is given by expression (2) as follows:

$$\sum_j p(T_j) \sum_j p(I_i | E)[t(I_i) - T_j t_i^f] \qquad (2)$$

where:

$$T_j t_i^f \leq t(I_i),$$

and

E represents observed evidence, i.e., for example, the current status of: task instances, the processing and application environments, and other pertinent characteristics.

Expected savings gained from idle-time computation can be viewed as set forth in expression (3):

$$\sum_j p(T_j) \sum_i p(I_i | E)[T_j t_i^f]. \qquad (3)$$

For the next period of constant idle-time, T, the expected savings can be expressed in expression (4) as:

$$T \sum_i p(I_i | E) t_i^f. \qquad (4)$$

Hence, these savings will be optimized by maximizing the quantity $$\sum_i p(I_i | E).$$

Thus, from this, given an ordering of future task instances with conditional probabilities, $p(I_1|E) > p(I_2|E) > \ldots p(I_n|E)$, representing the likelihood that the corresponding instance will be executed during the next idle-time interval, the idle-time fraction that minimizes expected computation time, i.e., run-time delay, in that next period is to apply available computation time to the most likely future task instance until it is completely solved, then the next most likely future task instance and so on until the cessation of the available idle-time or all potential future task instances have been executed in that period, whichever comes first. Moreover, if two or more of these future task instances possess equally valued likelihoods, the expected computation time in the next period, i.e., run-time delay, is minimized by partitioning resources, here available processing time, in that period to the equally likely instances in any configuration of fractions. Hence, for all such equally likely task instances, any one of them can be selected, on an indifferent basis, for computation during that interval without adverse effect on expected run-time savings.

In general, application response time, in terms of expected run-time delay, can be advantageously reduced by selecting the future task instance(s), that has the highest importance, in terms of its likelihood of occurrence, for precomputation during an idle-time interval.

In many settings, the cost of waiting for a computational result depends on context-dependent time criticality. Let me generalize the results on minimizing expected delay to minimizing an expected cost of delay. The generalization is based on an analysis similar to the one used herein to identify policies for minimizing delay. Assume that each future problem instance has a time-dependent cost function, Cost($I_i$,t), that takes as arguments, an instance and the time delay required to compute that instance following a problem-challenge. Beyond specifying time criticality as a function of the instance, a distinct context variable can be employed. Without precomputation, the expected cost of waiting for a response to a next successive challenge is:

$$\Sigma p(I_i|E) \text{Cost}(I_i, t(I_i)) \qquad (5)$$

The contribution to the overall expected cost of the delay required to solve each future instance $I_i$ is $p(I_i)\text{Cost}(I_i,t(I_i))$. Idle time $T \leq t(I_i)$ applied to precomputing instance $I_i$ will reduce the expected cost of delay by $p(I_i) [\text{Cost}(I_i,t(I_i)) - \text{Cost}(I_i,t(I_i)-T)]$.

The total usable idle time is allocated in such a way that minimizes expected cost. To identify an ideal continual-computation policy for the general case of nonlinear cost functions, search, or greedy analysis with small amounts of resource, can be employed. However, general strategies can be constructed for specific classes of cost functions. For example, consider the case where costs increase linearly with delay, $\text{Cost}(I_i,t) = C_i t$, where $C_i$ defines a rate at which cost is incurred for each instance $I_i$. The component of comprehensive expected cost contributed by the expected delay solving each instance $I_i$, is $p(I_i)C_i t(I_i)$. Allocating idle time to precompute an instance diminishes the expected cost or increases the expected value at a constant rate of $p(I_i)C_i$. The expected value in a next successive period is maximized by allocating idle time to commence solving the instance associated with the greatest expected rate of cost diminishment, $p(I_i|E)C_i$, and to continue until that instance is solved, and then to solve an instance with the next highest expected rate, and so on, until all of the instances have been solved. Resources can be allocated indifferently to problems with the same expected rate of diminishment of cost. In the next section, I will delve further into the use of rates of refinement in identifying continual computation policies for flexible strategies.

2. task instances exhibiting time-varying value

Figure 12:
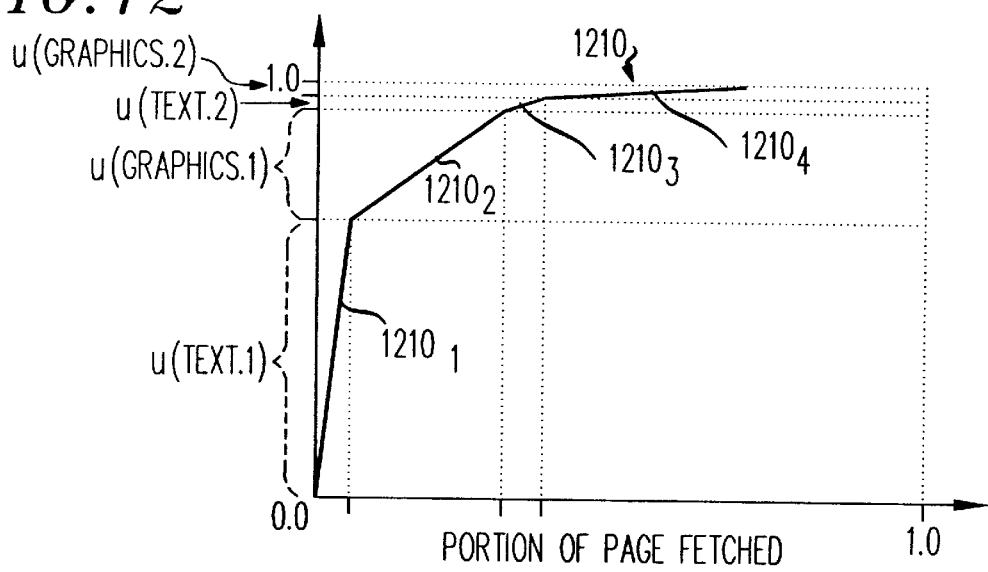
FIG. 12 graphically depicts illustrative function 1210 that shows utility, u, to a user as multiple graphical and textual portions of a common screenful for a web page are each fetched and rendered in succession.

Other tasks progressively produce results that have a value that varies with time applied to computation or networking. As the partial results, associated with a task instance are refined with ongoing network transmission or computation, the value of those results may well increase as that instance continues to execute until a final, precise result is ultimately produced. Such a task instance is typified by web page downloading—which will be discussed in detail below in conjunction with FIGS. 7, 9 and 12. Suffice it to say, as additional information is downloaded and increasingly large amounts of a single web page are displayed to a user until, e.g., a page with a fully rendered graphic is displayed, the value of the results, i.e., the entire page being displayed as it builds, increases—though not necessarily as a simple linear function. Another class of time-varying value producing tasks is sorting operations. As a sorting operation progresses, an increasingly large portion of an input data list is sorted and hence presents increasing value over time to a user, until the entire list has been sorted, at which point maximal value occurs.

In analyzing future task instances with time-varying value and selecting one from amongst a group of such tasks for precomputation, my present invention relies on characterizing such instances in terms of the expected value of computation (EVC) associated with each task and flexibly selecting such an instance that presents an optimal, i.e., maximized, EVC rather than just minimizing delay at run-time. I utilize EVC based on my recognition that the value of partial results provided by continued computation will change with time. EVC is an expected value of refinement of a result with computation, i.e., a product of the value of refinement of that result with continued (increased) computation multiplied by its probability of occurrence. Many tasks, particularly application invoked task instances that execute in a personal computer environment, are highly user dependent and hence can not be guaranteed to occur at any one time. Hence, the computational results of such task instances must account for uncertainty of their execution. Therefore, given a computer system that employs a flexible computation strategy, S, to select a task instance, I, for execution or to refine a partial result, $\pi(I)$, stemming from a prior computation, i.e., $\pi'(I)$, (the partial result being a transformed task instance I'), this strategy can be framed, using conditional probabilities, as depicted in equation (6):

$$S[\pi(I),t] \to p[\pi'(I)|\pi(I),S,t] \quad (6)$$

with EVC being given by equation (7) as follows:

$$EVC[S_i, \pi(I), t] = \sum_j p[\pi'_j(I) | \pi(I), S_i, t] u_o(\pi'_j(I)) - u_o(\pi(I)) \quad (7)$$

where: $u_o(\pi(I))$ is an object-level value (utility) of a previously computed result ($\pi(I)$). Where cost is deterministic and separable from the value of computation, net EVC (NEVC) can be given by equation (8) as:

$$NEVC[S_i,\pi(I),t] = EVC[S_i,\pi(I),t] - C(t) \quad (8)$$

where: C(t) represents cost of the computation.

To maximize NEVC, first assume that the selection of computation strategy S is predefined or optimized with S* referring to such an optimized strategy. Since costs of processing one task instance as against another during any one idle-time interval are not likely to differ between these instances, then NEVC will be maximized coincident with maximizing EVC. Given this, maximal EVC for a next successive idle-time interval occurs when resource fraction $t_i^f$ is selected to optimize an expected value of precomputation (EVP), i.e., the value of precomputing results or partial results for a future task instance. The value of allocating resources to precomputing future task instances in a computer system that relies on a flexible computation strategy, S, can be characterized in terms of a rate at which the best strategies can deliver value with continuing computation. In that regard, I utilize the term "EVC flux" (also denoted as $\phi$ and also referred to herein as simply "flux") to refer to a rate of refinement (change) in value with continued computation time. The EVC flux, $\phi(S,I,t)$, for a given strategy S used in conjunction with a given task instance I, denotes an instantaneous time rate of change, i.e., the derivative dEVC/dt, at which this strategy delivers value at t seconds into the execution of that instance.

Figure 3A:
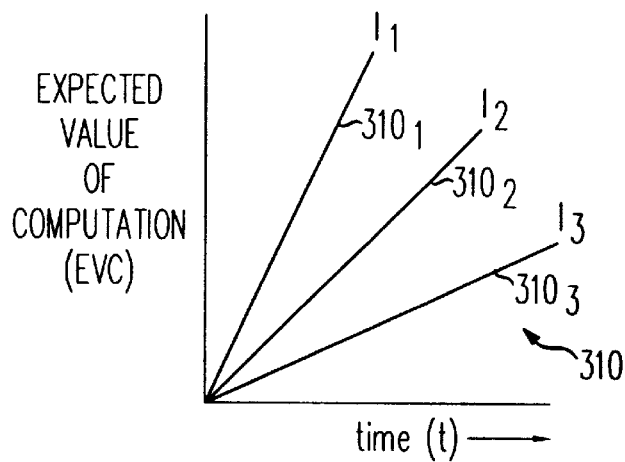
FIG. 3A graphically depicts illustrative linearly-increasing expected value of computation (EVC) curves 310 for three different task instances.
Figure 3B:
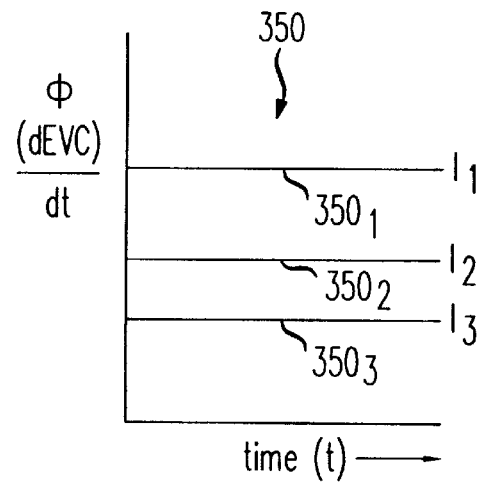
FIG. 3B graphically depicts EVC flux, i.e., instantaneous time rate of change in EVC (dEVC/dt), curves 350 associated with curves 310 shown in FIG. 3A.

At this point, consider FIGS. 3A and 3B. The former figure graphically depicts illustrative linear EVC curves 310, specifically lines $310_1$, $310_2$ and $310_3$, for three different task instances, $I_1$, $I_2$ and $I_3$, respectively, over time. As can be seen, each of these instances generates expected value that linearly increases with continued computation time, t, shown as EVC ($I_1$)>EVC($I_2$)>EVC($I_3$). Given the linear nature of the EVC for these instances, the corresponding EVC flux values over the same time, t, are constant as shown by lines 350, specifically lines $350_1$, $350_2$ and $350_3$, depicted in FIG. 3B.

a. linearly varying EVC

For those task instances that exhibit constant valued EVC flux over time, the computational strategy that maximizes EVC, at the start of a next idle-time interval, is to apply available resources, here computation time available during that interval, to select and precompute the task instance that possesses the largest product of its probability and EVC flux—the product being a measure of incremental utility of the task instance. This task instance should, be processed until a final result is produced, then the future task instance possessing the next highest product should be selected and precomputed and so on, until either the available idle-time in this period expires or all potential future task instances have been precomputed to completion. Similarly to that discussed above for fixed task value (or importance), if two or more of these likely task instances exhibit equal probability-flux products, then the expected computation time in the next period, i.e., run-time delay, is minimized by partitioning resources, here available processing time, in that period to the equally likely task instances in any configuration of fractions. Hence, if all such equally likely task instances possess equally valued products, then any one of them can be selected, on an indifferent basis, for precomputation during that interval without adverse effect on expected run-time savings.

b. non-linearly varying EVC

Figure 4A:
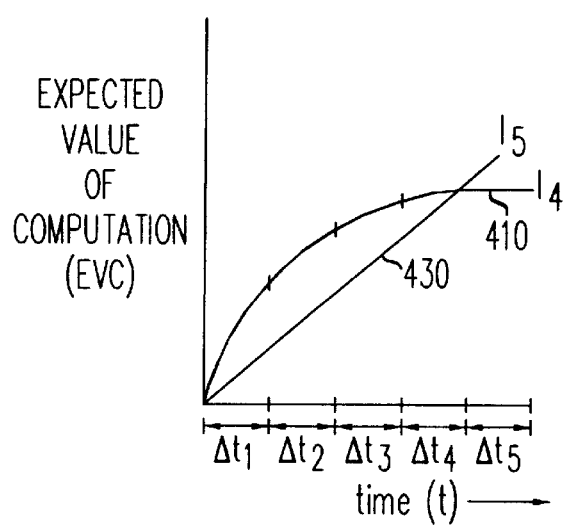
FIG. 4A graphically depicts non-linear EVC curve 410 for an illustrative task instance, along with, for purposes of comparison, constant EVC curve 430 for another task instance.
Figure 4B:
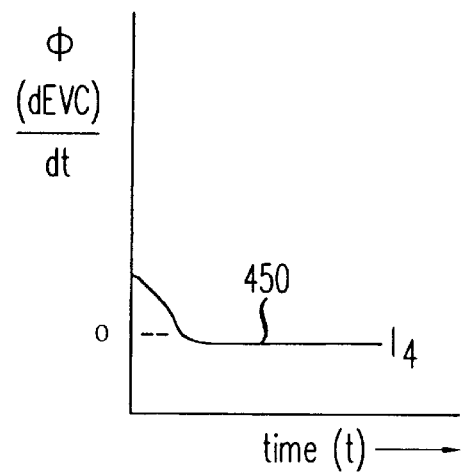
FIG. 4B graphically depicts approximate EVC flux curve 450 associated with curve 410 shown in FIG. 4A.

Task instances can also exhibit non-linear changes in EVC over time. Such changes can be either positive or negative, in that the EVC of an instance expands or contracts on a non-linear basis with continued computation. For example, FIG. 4A graphically depicts non-linear EVC curve 410 for illustrative task instance $I_4$, along with, for purposes of comparison, linear EVC curve 430 for another task, $I_5$. As can be seen, the EVC for task $I_4$ exhibits non-linear increases at small time periods, then flattens with increasing time. EVC flux curve 450, associated with curve 410, is depicted in FIG. 4B.

Generally, with non-linear EVC, I have recognized, in accordance with the present invention, that valid highly optimal, though somewhat approximate, allocation strategies can be found through myopic analysis of each idle-time interval to specify the task instance which then provides the largest incremental utility. Specifically, to do so, an idle-time interval is first parsed into successive relatively narrow pre-defined time slices, $\Delta t$. A contribution to EVP, i.e., $\Delta EVP(I_i)$, is determined for each time slice and for each future task then capable of being precomputed. This determination is made under a supposition of allocating $\Delta t$ worth of resources, here processing time, to precomputing or prefetching each such future task instance during that time slice, as generally given by equation (9):

$$\Delta EVP(I_i) = p(I_i|E) EVC(S^*, \pi(I_i), \Delta t) \quad (9)$$

The task instance which maximizes the incremental utility, i.e., for example the product of the probability and the EVC over this time slice, is selected to be precomputed and is allocated all available time during that slice. This process is repeated for each successive time slice during the idle-time interval with potentially differing task instances being selected for successive different slices, during a common idle-time interval, based on the optimization of equation (9) for each such slice. Here too, if the optimization yields, for any time slice, two or more task instances with equally valued products, then any one of these instances can be selected, on an indifferent basis, for computation during that time slice without adverse effect on expected run-time savings.

This time-slice approximation is based on assuming the EVC flux is approximately constant within any time slice. Hence, the accuracy of this approach increases as smaller time slices are used. With reference to FIG. 4A, if an idle-time interval were to be parsed into illustratively five equal time slices, each $\Delta t$ in length, hence forming slices $\Delta t_1$, $\Delta t_2$, $\Delta t_3$, $\Delta t_4$ and $\Delta t_5$, then equation (9) would be evaluated at the beginning of each of these five intervals.

For computational efficiency, a conventional "greedy" type analysis can be used to optimize equation (9) for each successive time slice in an idle-time interval. Inasmuch as "greedy" type analyses are well-known, then, for the sake of brevity, I will omit all further details of this analysis and refer the reader, for these details, to Chapter 4, pages 152–197 entitled "The Greedy Method" of E. Horowitz et al, *Fundamentals of Computer Algorithms* (© 1978, Computer Science Press), which is incorporated by reference herein.

As one can now appreciate and generally speaking, for those tasks that present time-varying value, application response time and overall system throughput can be enhanced by selecting, from amongst future tasks then available for precomputation:

(a) for future tasks that each exhibit linearly varying value with time, that task instance which would provide a maximum incremental utility measure, i.e., here which maximizes, for an idle-time interval, the product of the probability associated with that task and its EVC flux during that interval; and (b) for future tasks that exhibit non-linearly varying value, that task instance which would provide a maximum incremental utility measure, i.e., here which maximizes, during each time slice within an idle-time interval, the product of the probability associated with that task and its EVC flux during each such slice.

Moreover, costs may arise in computational systems based on the overhead of shifting attention from one problem to the next. Such costs can influence decisions about shifting to problems with greater EVC flux. Given the presence of costs of shifting attention, idle-time should be switched to refining an instance that yields a greater expected EVC flux only if the expected benefits of the switch are greater than the costs of the shift. To compute the expected net gain in shifting attention, one needs to consider the probability distribution over remaining idle time, $t^r$, given idle time that has already been expended, $t^e$. Using $EVC_i(t)$, as shorthand for $EVC(S,I_i,t)$ and $Cost^s$ as the cost of shifting attention, the expected value of shifting to the new instance is:

$$\int_{t^r} p(t^r \mid t^e)[EVC_2(t^r)p(I_2) - EVC_1(t^r)p(I_1)]dt^r - Cost^s \quad (10)$$

As an example, consider the refinement of partial results for instances that are each represented by a concave-down piecewise-linear EVC function. Idle time is selected and applied to solve the linear segment of the instance associated with the largest expected EVC flux. However, when a segment is reached with a diminished flux, the value of continuing to refine the current instance versus moving to another instance with a greater expected flux must be re-examined—which, in the context of web page downloading, will be discussed below with respect to downloading just portions of successive web pages. Assume that the expected EVC flux for a next leg of refinement for the current instance, $p(I_1) C_1$, is less than the expected EVC flux for another instance $p(I_2)C_2$, that is, $p(I_1)C_1 < p(I_2)C_2$. The expected value of shifting to the new instance is:

$$\int_{t^r} p(t^r \mid t^e) t^r [C_2 p(I_2) - C_1 p(I_1)]dt^r - Cost^s \quad (11)$$

Equation 12 specifies that it will only be worth shifting if mean remaining idle time, $\bar{t}^r$, is greater than a ratio of the cost of shifting attention and a difference of the expected rates, i.e., as given by equation (12) below:

$$\bar{t}^r > \frac{Cost^s}{C_2 p(I_2) - C_1 p(I_1)} \quad (12)$$

3. future task instance(s) that exhibit greater present value than does a currently executing task I have recognized that in certain situations, a future task instance(s), if precomputed, could provide greater expected value than the value provided by a task which is currently executing. In that regard, a portion of current task execution could be intentionally degraded or that task instance completely suspended, hence retarding or even halting execution of that task and freeing processing capacity, in favor of allocating that capacity to such a future task instance. Considering the net present value of results to be delivered by precomputing a future task instance necessitates time-discounting the net expected value of these results to the present. The discounted net expected value is then compared to losses in current value that would result from reducing or prematurely suspending the refinement of a current task instance. If the discounted value for any such future task instance(s) exceeds these losses, then a portion of present processing capacity is diverted from the presently executing task in favor of precomputing the future task instance(s).

An immediate loss of dedicating current resources, such as processing time, over a period of time is the product of that resource and average EVC flux over that period. The gains of allocating these resources to a future task instance is a function of the total amount of idle-time that will be presently available after a current task is degraded or prematurely suspended. If this idle time is sufficient, in duration, to fully process not only the present task instance but also all possible future task instances, then essentially nothing can be gained by transferring current resources to precomputing any future task instance. Hence, the expected value needs to be modified by a probability distribution, in terms of duration, taken over the available idle time.

Inasmuch as task instances, whether present or future, can exhibit either a linear or non-linearly varying EVC with time, discounted net present value of each one of all possible future tasks is determined at the onset of each pre-defined time slice, again referred to as $\Delta t$, of a current processing interval—regardless of whether that interval is marked by idle-time or high processing activity. The gain in transferring current processing time to precomputing a future task instance is determined by weighting the duration of available idle time by the probability distribution over that time.

a. linearly varying EVC

The future task instances ($I_i$) that exhibit a linear time-varying EVC are rank ordered in terms of, for each such task, the product of its EVC flux, $\phi_i$, and its associated conditional probability of occurrence, $p(I_i|E)$.

In computing the value of precomputation (EVP) achievable through a slice of current processing time, the uncertainty about the EVC flux that will be achieved through use of that processing time must be considered particularly since that uncertainty will depend upon the future task instance to which that time will be allocated. Moreover, the EVC flux generated by this time-slice depends on the total usable idle time, T, and an amount of time thereof that has already been re-allocated to future computation, $t_a$.

Hence, the current value of transferring a slice, $\Delta t$, of current processing time to precomputation, i.e., discounted EVC, is given, across all future tasks ($I_i$ for i=1, ..., n), by expression (13) as follows:

$$d\left[\sum_{t=0}^{t(I_1)-t_a} p(T)\varphi_1 \Delta tp(I_1|E) + \sum_{T=t(I_1)-t_a}^{t(I_1)+t(I_2)-t_a} p(T)\varphi_2 \Delta tp(I_2|E) + \cdots + \sum_{T=\sum_{i=1}^{n}t(I_i)-t_a}^{\sum_{i=1}^{n}t(I_i)-t_a} p(T)\varphi_n \Delta tp(I_n|E)\right] \quad (13)$$

where: d is a constant positive time-discount factor (0<d≦1).

As one can appreciate, as the amount of total time allocated to a particular task instance increases so that $t_a \geq t(I_i)$, the future task instance, $I_i$, (and its associated term) is removed from the expression, as that instance will have been completely processed through precomputation. Though the time-discount factor is illustratively a constant applied across all future task instances, this factor can also be applied to each individual future task instance and can vary linearly or non-linearly with time, as appropriate, to accurately reflect diminution to the present of net expected value, to be provided in the future, by that individual future task instance.

Hence, in accordance with my inventive teachings, I conclude that current resources, such as processing time, should not be allocated to a future task if the EVC flux provided by the currently executing task instance exceeds the largest incremental utility measure of that future task instance, i.e., for example, the largest product of the probability of a future task instance and the EVC flux of that future task instance. Therefore, if for any time slice, the EVC flux for the currently executing task instance exceeds a largest incremental utility measure (i.e., the product of the EVC flux and the probability of the future task instance), then the affect on this product of discounting as well as the probability associated with idle time are both irrelevant and need not be considered, inasmuch as precomputation would be inferior to continuing the task instance that is currently executing during this slice. Alternatively, if precomputation is warranted, i.e., the discounted product exceeds the EVC flux for the currently executing task instance, then execution of this current task instance is suspended (which here includes its premature termination or merely retarding its execution, as appropriate) and the future task instance having the largest product of probability and EVC flux is then precomputed to the fullest extent possible.

b. non-linearly varying EVC

For future task instances having non-linearly varying EVC, the EVC flux of the presently executing task is compared to the discounted incremental utility measure, i.e., here discounted EVC flux-probability product, of the future tasks, with precomputation occurring only if the latter exceeds the former. This comparison could occur at either of two intervals: either at regular time slices, as described above, or, for each future task instance that is being precomputed, at the conclusion of that future task instance. In the latter situation, precomputation would continue only if the discounted EVC flux-probability product for the future task exceeded the EVC flux of the current task then suspended. As additional future task instances are encountered, their discounted EVC flux-probability products would be considered in an identical fashion. Likewise, as a future task instance is precomputed, its discounted EVC flux-probability product is removed from further consideration.

Whenever precomputation is to occur, then for computational efficiency, a conventional "greedy" type analysis, as noted above, is then used to select the particular future task for precomputation, i.e., having the highest EVP, from amongst those then pending.

To enhance understanding of the concept of allocating resources to precompute a future task instance at the cost of prematurely suspending a presently executing task instance, the reader should now consider FIG. 4C.

This figure graphically depicts illustrative non-linearly varying ϕ×p curve 460 for a currently executing task instance and illustrative linearly varying discounted ϕ×p curve 470 associated with a future task instance pending for precomputation. Initially, assume that the task instance represented by curve 460 is executing and continues to do so through time slice $\Delta t_1$. At the end of this slice, curve 460 has an illustrative magnitude $l_1$ which exceeds a magnitude then exhibited by future task instance curve 470. Consequently, the present task instance continues to execute. At the end of the next time slice, i.e., $\Delta t_2$, curve 460 still exhibits a greater magnitude, i.e., here $l_4$, then does curve 470. Hence, current processing resources, here processing time, continue to be allocated to the presently executing task instance to further its execution and achieve current value thereby. Inasmuch as curve 460 begins to exhibit a downwardly concave shape starting in time slice $\Delta t_3$ and continuing into time slice $\Delta t_4$, the current task instance yields increasingly less incremental current value relative to that which can be had, discounted to the present, through precomputing the future task instance. Inasmuch as the incremental value provided by the currently executing task instance at the onset of each of time slices $\Delta t_3$ and $\Delta t_4$, i.e., magnitudes $l_4$ and $l_3$, respectively, still exceeds the EVC provided, on a discounted basis, by the future task instance at those times, processing resources continue to be allocated to the former task instance for the remainder of each of these intervals. However, at the onset of the next time slice, i.e., $\Delta t_5$, the discounted EVC provided by the future task instance now exceeds the incremental value provided by current task instance, i.e., magnitude 11. Consequently, since the future task instance will provide greater EVC, discounted to the present, processing resources, here processing time, are allocated to the former rather than the latter instance. Hence, the currently executing task instance is terminated in favor of precomputing the future task instance. Inasmuch as the discounted EVC provided through precomputation of the future task instance will continue, though time slice $\Delta t_6$ to exceed the EVC of the current task instance (now suspended), precomputation of the future task instance will continue through this time slice as well. A similar graphical analysis can be made between any presently executing task instance and a future task(s) instance to determine whether precomputation of the latter should occur and when.

For further details on precomputation of future task instances during intervals of low processing activity, including idle time, or allocating current processing resources to future task instances, the reader is referred to my co-pending U.S. patent applications, all filed on May 2, 1997: "Apparatus and Methods for Optimally Using Available Computer Resources for Task Execution During Idle-time Based on Probabilistic Assessment of Future Task Instances" assigned Ser. No. 08/850,346, now U.S. Pat. No. 6,009,452; "Apparatus and Methods for Optimally Using Available Computer Resources for Task Execution During Idle-time for Future Task Instances Exhibiting Incremental Value with Computation" assigned Ser. No. 08/850,621, now U.S. Pat. No. 5,784,616; and "Apparatus and Methods for Optimally Allocating Currently Available Computer Resources to Future Task Instances versus Continued Execution of Current Task Instances" assigned Ser. No. 08/850,409, now U.S. Pat. No. 5,995,997; all of which are commonly assigned to the present assignee hereof and are all incorporated by reference herein.

C. Hardware aspects of present invention

Figure 5:
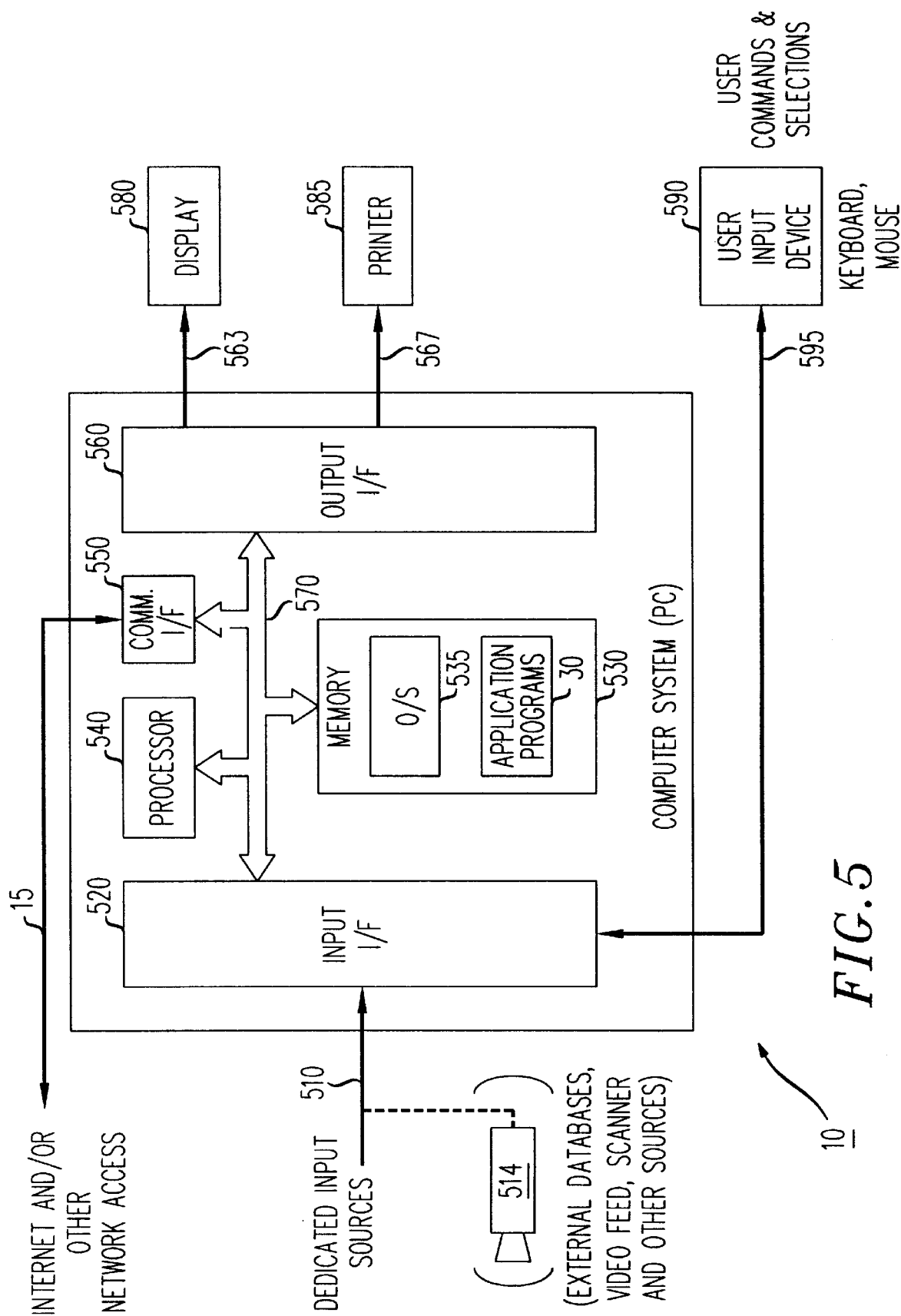
FIG. 5 depicts a high-level block diagram of computer system (PC) 10 that implements one embodiment of my present invention.

FIG. 5 depicts a high-level block diagram of client computer (PC) 10 that implements the present invention. As shown, computer system 10 comprises input interfaces (I/F) 520, processor 540, communications interface 550, memory 530 and output interfaces 560, all conventionally interconnected by bus 570. Memory 530, which generally includes different modalities (all of which are not specifically shown for simplicity), illustratively random access memory (RAM) and hard disk storage, stores operating system (O/S) 535 and application programs 30. Where my invention is used, as described above, for prefetching and storing web pages, during idle or other low activity processing times, the specific software modules that implement my inventive teachings would be illustratively incorporated within application programs 30 and particularly within web browser 35 (see FIG. 1, as discussed in detail above, and FIG. 7 to be discussed shortly below). O/S 535 may be implemented by any conventional operating system, such as the WINDOWS NT operating system. Given that, I will not discuss any components of O/S 535 other than a browser or shell as they are all irrelevant. Suffice it to say, that the web browser may be integrated into the shell of the O/S or may execute as one of application programs 30, executes under control of O/S 535.

Advantageously, my present invention, when embedded for use within a shell or web browser, such as browser 35, requires no user interaction and thus can be substantially, if not totally, transparent to the user.

As shown in FIG. 5, incoming information can arise from two illustrative external sources: network supplied information, e.g., from the Internet and/or other networked facility, through network connection 15 to communications interface 550, or from a dedicated input source, via path(es) 510, to input interfaces 520. Dedicated input can originate from a wide variety of sources, e.g., an external database, a video feed such as from local (or remote) video camera (e.g., a CCD imager) 514 or other video source, a scanner or other input source. Input interfaces 520 are connected to path(es) 510 and contain appropriate circuitry to provide the necessary and corresponding electrical connections required to physically connect and interface each differing dedicated source of input information to computer system 10. Under control of the operating system, application programs 30 exchange commands and data with the external sources, via network connection 15 or path(es) 510, to transmit and receive information typically requested by a user during program execution.

Input interfaces 520 also electrically connect and interface user input device 590, such as a keyboard and mouse, to computer system 10. Display 580, such as a conventional color monitor, and printer 585, such as a conventional laser printer, are connected, via leads 563 and 567, respectively, to output interfaces 560. The output interfaces provide requisite circuitry to electrically connect and interface the display and printer to the computer system. As one can appreciate, the particular type of input and output information and a specific modality through which that information is applied to or produced by system 10 are both immaterial for purposes of the present invention and thus will also not be discussed in any detail any further.

Furthermore, since the specific hardware components of computer system 10 as well as all aspects of the software stored within memory 530, apart from the modules that implement the present invention, are conventional and well-known, they will not be discussed in any further detail.

D. Software aspects of present invention and URL retrieval access strategies

Figure 6:
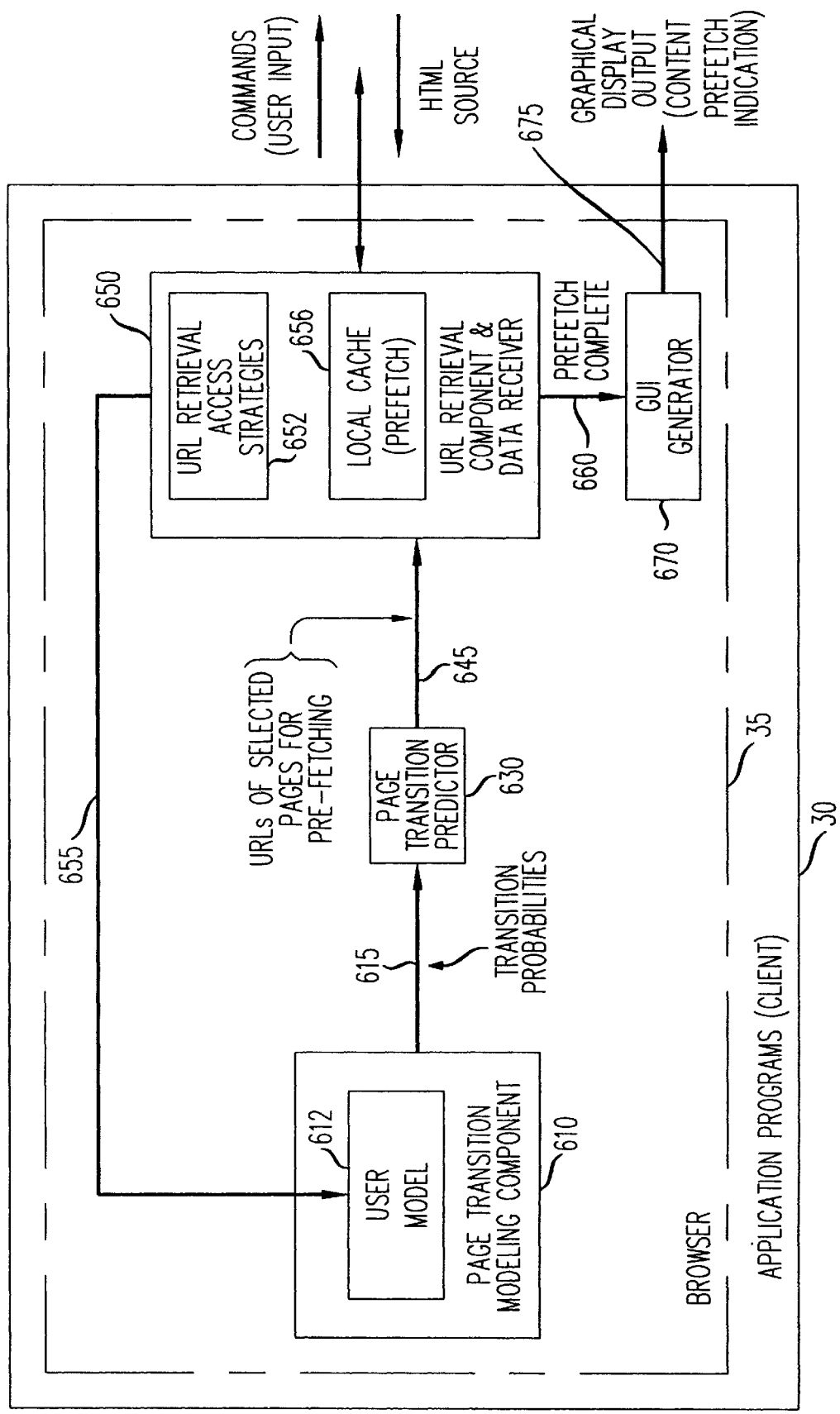
FIG. 6 depicts a high-level block diagram of those portions of application programs 30, specifically web browser 35, that execute within client computer system (PC) 10 and collectively implement an illustration embodiment of my present invention.

FIG. 6 depicts a high-level block diagram of those portions of application programs 30, specifically web browser 35, that execute within client computer system (PC) 10 and collectively implement one embodiment of my present invention.

As depicted, browser 35, to the extent relevant, contains page transition modeling component 610, page transition predictor 630, URL retrieval component and data receiver 650 (also referred to here as simply "component 650") and graphical user interface (GUI) generator 670. Component 650 includes URL retrieval access strategies 652 (typically stored definitions) which specify a particular strategy to be used in prefetching web pages. These strategies, in their alternative, include prefetching: (a) predefined pages in their entirety as ordered by their utility; (b) predefined portions of a page, such as text first then graphics, in terms of their utility before prefetching portions of another such page in the same fashion; (c) predefined screenful(s) of a common page in order of their utility to a user; and (d) separate screenfuls ordered by their utility, where for each screenful, predefined portions, e.g., text and graphics, are fetched by their utility, e.g., text before graphics. As an aside, a web page can and often does contain multiple screenfuls of content. Though any one and/or a combination of these strategies can be used to prefetch successive web pages—with different strategies being employed for different pages, to simplify the ensuing discussion of browser 35, I will discuss the browser, as shown in FIG. 6, in the context of prefetching complete web pages and then specifically address the different access strategies and their implementation in conjunction with FIGS. 7–14.

In operation, once a user enters a URL for a desired web page, URL retrieval component and data receiver 650 generates and transmits appropriate instructions, for carriage over network 50, to server 60 (see FIG. 1) to fetch appropriate files, e.g., HTML files, for that page. Component 650, as shown in FIG. 6, also supplies, as symbolized by line 655, the URL for that page to page transition modeling component 610. Modeling component 610 incorporates user model 612. This model specifies for a given web page, in terms of its URL, a set of successive web pages (one or more and in terms of their URLs) to which the user is likely to next transition, i.e., visit next, and for each such page a numeric probability (hereinafter a "transition" probability) that the user will select that particular page. For a given user, this model is probabilistic in nature, such as, e.g., a Bayesian network or a special class of general probabilistic models, such as a Hidden Markov model, which encodes past preferences of that user in terms of conditional probabilities of transitioning to a given URL given the page (s)he is presently viewing. This set and the transition probability associated with each URL therein are collectively supplied, as symbolized by line 615, to page transition predictor 630. The predictor, given these probabilities, ranks the URLs in the set and then supplies these URLs, rank ordered in descending order of their transition probabilities, to URL retrieval component and data receiver 650. In response to this set, component 650 then prefetches the content for URL(s) in the set in accordance with an applicable predefined access strategy stored in URL retrieval access strategies 652. For the strategy of prefetching entire web pages, component 650 would prefetch the web page content, i.e., all of it, from the URL then exhibiting the highest transition probability. The resulting content, supplied by an appropriate web server for that page, is received by component 650 and stored in local cache 656 for subsequent access. Prefetching would continue until either of two events occurred: the page was completely prefetched or a termination condition arose, whichever occurred first. Such a condition includes any other interruption in prefetching, such as a break in a network connection between browser 35 and server 60 (see FIG. 1), or cessation of an available interval of low activity, such as idle time (as discussed above), at the client computer and/or on the network which was then being used for prefetching. Additionally, once a page has been completely prefetched and additional low processing activity time remained, then component 650 would prefetch the web page for that URL, in the ordered set, having the next highest transition probability and store the content for that page in local cache 656, and so on until either all the pages for the URLs in the set were successively prefetched and their contents stored in cache 656 or a termination condition occurred. Should the user next select a page from any prefetched URL, the content will be read directly from cache 656 and rendered on display 580 (see FIG. 5) associated with the client computer.

GUI generator 670, which forms a part of browser 35, creates a graphical user interface which, in conjunction with O/S 535 (see FIG. 5), is depicted on a display screen of display 580. The user by suitably manipulating user input device 590, specifically the keyboard and/or mouse, in conjunction with information then being display on the GUI, interacts with the browser. Whenever a page (or page component as discussed below) has been prefetched and stored into local cache 656 shown in FIG. 6, component 650 will suitably inform, as symbolized by line 660, generator 670 through a suitable prefetch complete message (or the like). Consequently, the generator will then produce, as symbolized by line 675, an appropriate output (i.e., a "prefetch indication"), that when visually displayed on the GUI, indicates to the user that this page (or component) has been prefetched and stored within local cache, and is now ready for access by that user.

Such an indication may illustratively include: changing a color of a hypertext link (hotlink) displayed by the browser and associated with the page (or component); underlining the hotlink; changing a font, by size and/or type, or other formatting attribute with which the hotlink is depicted; or, generally speaking, any visual feature, attribute or visual cue that can distinguish this hotlink from another that is presently being displayed or signify the status of this hotlink as being prefetched. Moreover, as additional pages are cached, generator 670 can color code the indications for each of the pages to reflect the relative latency of each of these pages within local cache 656. In this instance, generator 670, using a list maintained by component 650 of pages (and/or page components, as discussed below) then residing within the local cache, can either through appropriate software timers or simply using relative ordering of these items in the cache, change the color code of each such item to reflect changes in its latency as each new item is added to the local cache. As noted above, red could be used to indicate a page (or component) that was mostly recently prefetched and added to the local cache, with blue indicating a page (or component) that is the "oldest" item in the cache, with ordered hue gradations therebetween signifying other pages (or components) with correspondingly intermediate latencies. For any hotlink that has been purged from the cache by component 650, generator 370 would cease displaying that hotlink with a prefetched indication.

The existence of a prefetched page can also be indicated by the browser by a new entry, such as a URL or page title, in a pop-up or pull-down list of prefetched cached items— with the entry being appropriately colored or not, if desired, to reflect its relative latency. This list would be maintained by component 650 to mirror the current contents of cache 656. In that regard, generator 670 could produce a status icon, at an appropriate location on the GUI, to indicate that prefetching is occurring in order to appropriately inform the user. The user, seeing this icon, could then, through, e.g., suitable manipulation and "clicks" of a mouse manually access the pull-down list to examine the current contents of the cache and then select any desired item therein for display.

While a prefetch indication is preferably visual in nature, this indication also includes an audible or tactile indication or any other form of communication sufficient to inform a user or attract the attention of that user that a page (or component) has been prefetched.

Inasmuch as all other aspects of the GUI produced by generator 670 are conventional, I will omit all such aspects from the remaining discussion.

Pages can be alternatively be accessed through a proxy server (not specifically shown) accessible, through a network connection, to client computer 10 (see FIG. 5). In this instance, the pages (or components) can be prefetched and stored either locally on the client computer or at the proxy server itself. In the latter, the proxy computer could provide suitable prefetch complete messages, similar to those symbolized by line 660, to browser 35 executing at the client such that the browser could provide appropriate visual indications of all pages (or portions) then residing in the prefetch cache, though maintained at the proxy, to the user. Should the user then select such a page, by, e.g., "clicking" on its hotlink, the browser would then retrieve the page (or component) from the proxy computer, store it within local cache 656 and then display the content of that page.

In any event, as soon as a user finishes viewing a current page and enters a URL for the next page, in any of the ways set forth above, that particular page is retrieved (either, if it has been prefetched, from local cache 656 (see FIG. 6) or, if it has not been prefetched, from a corresponding web server) and rendered by component 650. In addition, component 650 supplies the URL for that next page to user model 612 as symbolized by line 655 to yield a new set of pages to be prefetched, and so on for each successive web page that the user enters.

Browser 35 performs web page prefetching during, e.g., periods of low processing activity, such as idle time, at client computer 10 (see FIG. 1). As a result, the user is not relegated to operating solely in a time-staggered fashion with browser 35, i.e., each waiting for the other to finish (particularly the client computer waiting for the user to indicate a next successive page)—as would occur with a conventional web browser, but rather in substantially a pipe-lined fashion where prefetching advantageously consumes processing time that would otherwise be wasted while the user examined a page then being rendered on a local display. In those access instances where available capacity on the network is not sufficient to accommodate prefetching at will, browser 35, specifically component 650 (see FIG. 6), would perform prefetching during intervals of relatively low network activity to utilize available, and otherwise potentially wasted, network capacity. In that regard, component 650 could simply measure response time to a transmitted command to a web site as a measure of network activity or probe the network to determine its available capacity. Similarly, and where a large file is being requested for prefetching, component 650 could also probe a corresponding web server to determine its current response time and then prefetch the file only if the server could accommodate the request in a sufficiently timely manner.

Though user model 612 is probabilistic in nature, it can be fabricated through a wide variety of different approaches and/or combinations of those approaches. Illustratively, the user model can be: (a) based solely on statistical usage log data aggregated over a substantial number of visitors to each of a number of common web sites; (b) for a given user, based solely on page transition data collected by browser 35 on the client side for that user; (c) based on empirical data about user behavior, e.g., patterns of user page transitions as a function of page content, structure, user activity and/or other affects; (d) "expert authored" models constructed by people having expertise in user behavior; (e) for any given user, an empirically based or expert authored model modified by real-time measurements of that user's behavior; or (f) a combination of any two or more of these approaches.

In particular, for a current page being visited on any given site, a user model based on statistical analyses of usage log data, which will be discussed in detail below in conjunction with FIG. 14, merely returns a set of URLs for pages, rank ordered in terms of their likelihoods of being accessed next, that, statistically speaking over a large user community, is likely, within a predefined probability bound, to include a page to which the user is next likely to transition—generally on that site though pages located elsewhere can be included. Such statistical-based models can be generalized to predict transitions or sets of transitions as a function of sets of pages or, with increasing sophistication, sequences of pages accessed. Beyond relying on statistics collected from multiple users that have requested specific pages on one or more specific servers, patterns of a particular user's page transition behavior as a function of content and/or action (i.e., interactivity of the user with the browser as discussed in detail below) can be learned by considering a specific behavior of that user. Furthermore, general models of transition behavior can be built by experts or from data gathered in empirical studies with human subjects about the behavior of users as a function of the general structure of pages, including such considerations as the position, highlighting, and graphical nature of links, and real-time evidence about such acute activity as user actions, such as, e.g., a pattern of access of links, mouse cursor motion, and page scrolling and dwelling. Whether the models of page transitions and user interest are derived solely from log files, from watching a specific user, from general expertise, from general studies of page structure and user activity, or from any combination of these, the probabilistic models would be used in the page transition predictor 630 to select a group of rank ordered URLs for prefetching. While a usage log based model stored on the server or client side is implementationally simpler than constructing and processing custom-tailored models for a specific user learned from watching the behavior of that user, or general models of user activity as a function of behavior and page structure, such a usage log based model requires, as input, log data from a web server in order to delineate, for each page on the site, a set of web pages that is then to be prefetched. Unfortunately, web site log data is often not available to any visitor to the site. Hence, in practice, for use with many web sites, user model 612 is likely to be either a general model of user activity built by experts (i.e., expert authored) and/or from studies of user behavior, or such a model, modified or tuned by watching specific users. Such user models typically include, e.g., Bayesian models, such as, at decreasing hierarchical levels, general Bayesian networks, specializations such as Hidden Markov models, a decision tree derived from a Bayesian network, a Bayesian model or a Hidden Markov model and collectively containing a set of predefined rules or functions that generate likelihood estimates over a set of URLs and/or corresponding web page components. For any user, the corresponding user model can also be implemented through an adaptive handcrafted model that varies its internal coefficients based on actual observed user behavior, e.g., user interactivity with the browser. In addition, depending on available data from a given web server, user model 612 can include a probabilistic-based user model for some web pages and/or a statistically-based log data model for others, or models based on information residing at both the client computer and the server about user interests.

Generally speaking, through my inventive teachings, given information about relative likelihoods that different web pages would be accessed by a user within a short time, e.g., in a next period or during a current web session, low activity time, such as idle network and idle processing time, can be used to prefetch pages in an optimal order (as noted above), i.e., before they are requested by the user, so as to maximize the expected value of computation in the client computer and an expected value of network usage.

I have noted above that various different access strategies can be used to prefetch web pages or portions of those pages. I will now turn to discussing FIGS. 7, 9 and 12 which graphically depict three corresponding illustrative utility functions, for a web page, that can arise while that page is being fetched. I will also discuss accompanying processes, shown in FIGS. 8, 10A and 10B, 11A and 11B, and 13A and 13B for implementing access strategies, in, e.g., browser 35 (shown in FIG. 6), that exploit these utility functions.

Incremental utility of a web page to a given user is not only subjective to that user but also highly contextually dependent on page content and current informational goals of that user. In that regard, the relative importance of a portion of a web page will differ, often drastically, based on what information, if any, the user is seeking. For example, a portion of a page that provides a desired response to a targeted user search query will be far more important and hence possess far greater utility to that user than if that user were merely "surfing the web" with no specific informational need in mind. Hence, given such user and context dependent factors, a pure single-user centric utility function is likely to be rather impractical.

However, given a large user community, certain rather realistic and simple assumptions can be made as to web page utility functions.

First, for those web pages (or portions of those pages) that are valuable only after they are completely fetched, i.e., an "all or nothing" model, can be employed, in accordance with my inventive teachings, to fetch web pages in an order of the probabilities that they will be accessed next, much as future task instances can be ranked in terms of their probability or importance, as shown and discussed above in conjunction with FIG. 2. In this "all or nothing" model, predefined portions of pages include fetching some predefined number of pages, i.e., screenfuls, or a predefined quantity of content rather than attempting to fetch all the pages associated with a URL.

With increasingly flexible models of page utility, it is reasonable to assume that utility of a fetched page changes based on the portion and composition of that portion of the page that is then available in local cache. Most generally, the utility of a page can be modeled, at various levels of the completeness of its fetch, by functions that describe: (a) how the utility (value of that page to a user) changes as increasing amounts of the total page content are fetched; and (b) effort required, i.e., costs in time to be incurred during prefetching, to download specific portions of the page content for the corresponding URL.

Figure 7:
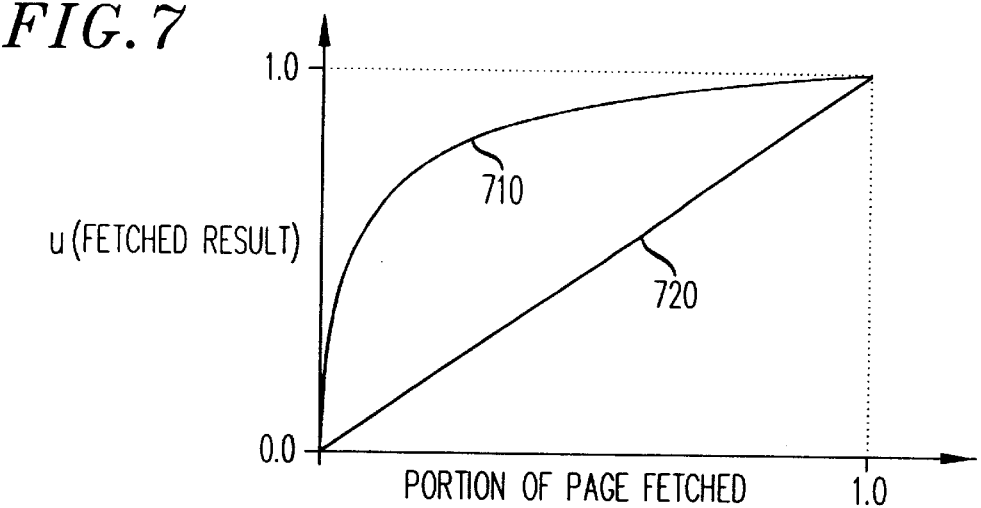
FIG. 7 graphically depicts illustrative functions 710 and 720 that show utility, u, to a user as a complete web page is increasingly fetched and rendered.

In many instances, as a web page downloads and is increasingly rendered by the browser, the page exhibits a non-linear utility function to a user. Function 710 graphically depicted in FIG. 7 is one such function. If the maximum utility of a web page, once fully rendered, is normalized to a value of one, then, in the case of this function, incremental utility rises rapidly as the browser starts rendering the page and as the page is increasingly rendered to completion, the utility reaches an asymptote of one. This utility function can be modeled, for computational simplicity, by function 720 wherein the page utility is a simple linear function of the total amount, e.g., measured in bytes, of data, regardless of its type (whether text or graphics), that has been prefetched for the corresponding page.

Inasmuch as the rate of change (rate of refinement) in value with time to the user (or utility or benefit; with utility and benefit being synonymous, in the context of this application, with value) of a page being rendered with increased time, i.e., flux (here denoted as $\phi_W$ so as to distinguish it from EVC flux $\phi$ discussed above), will be constant for those web pages that each exhibit a simple linear utility function, these pages can be optimally selected for prefetching in order of a value of a product of their flux multiplied by a probability that that page will be accessed next—as discussed above in conjunction with those task instances depicted in FIGS. 3A and 3B selected and pre-computed in order of products of their constant-valued EVC flux multiplied by their corresponding probabilities of occurrence.

For web pages having this simple linear utility function, FIG. 8 depicts Predefined Results Fetch Process 800 which is performed by browser 35 to implement a corresponding page-based retrieval strategy.

This strategy is predicated on simply fetching some predefined portion, such as x bytes of data or more appropriately y screenfuls of text, for a URL. During low activity time, page portions are fetched in the order of their likelihood that they will be fetched by a user during a current session. Data ceases being prefetched from one URL and starts being prefetched from another URL whenever a total desired portion of a page has been prefetched from the former URL or a termination condition has occurred which interrupted prefetching.

In particular, upon entry into process 800, block 810 is first executed. This block, given a current web page being rendered to a user, determines a set of URLs for those web pages any one of which the user is likely to next transition. Thereafter, execution proceeds to block 820 which assigns a numeric likelihood (probability value) to each of the URLs in the set or to just predefined "key" URLs in that set, such as those, as discussed below in conjunction with FIGS. 15A and 15B, to which the user is most likely to transition given, e.g., an immediately prior user selection of a control on the rendered page or even position of a mouse pointer or a cursor on that page in view of user dwell time at that position. Blocks 810 and 820 utilize the user model to construct the set of URLs and assign a probability to each URL in that set. Once these likelihoods are assigned, execution proceeds to block 830 which sorts the URLs in the set in descending order of likelihood. Next, block 840 is executed to set a pointer, CURRENT, to point to the URL in the set that has the highest likelihood measure. Once this occurs, a loop composed of blocks 850–870 is entered to successively prefetch web pages or portions of those pages. In particular, upon entry into this loop, block 850 is executed to fetch a predefined amount of content from URL (CURRENT) in the set until either this amount has been downloaded or a termination condition has occurred. Thereafter, block 855 executes to visually signify, through the browser GUI and as discussed above, to the user that this content has been prefetched and stored within local cache 656. Though not specifically shown, block 855 can also modify the visual (color coded) designations for each of the prefetched pages then residing in the local cache to depict relative latency ("aging") of each of these pages. Execution then proceeds to decision block 860 which, when executed, determines whether content for the last URL in the set has been downloaded or a termination condition has occurred. If neither of these events arose, then decision block 860 routes execution, via NO path 873, to block 870. This latter block sets the pointer CURRENT to point to a URL in the set which exhibits the next highest likelihood. Once this occurs, execution loops back to block 850 to prefetch page content for this particular URL, and so on. Alternatively, if content for the last URL in the set has been downloaded or a termination condition has occurred, then execution exits, via YES path 877, from process 800.

Increasingly refined utility functions can be formulated through piece-wise linear functions where different linear segments represent marginal refinement in utility that occurs while fetching different components of a web page, such as text and graphics. In this case, a web page would be broken into its components, such as separate textual and graphics portions. Given that certain components of a web page, such as text, convey data more efficiently than other such components and are often more valuable (exhibit a greater marginal utility) to a user than such other components, such as graphics, and are less expensive, in terms of network and computer time, to download, the former component should be downloaded first followed by the latter.

Consider a strategy of fetching partial pages for a URL that is characterized by a predefined constraint such as a total number of screenfuls of text or a total size of a corresponding file. Let me generally assume that utility of a complete fetch of a predefined portion, such as text or graphics, of a page carries a value of one and that the value of any components (some aspect of the text or graphics) is a linear function of that component being fetched, ranging from zero to a full value when that component has been completely fetched. A partial value of that component is a product of the portion of the component that has been fetched multiplied by the value of the entire component. For each URL, the components are sorted by a product of the rate that value is delivered during prefetching, i.e., flux $\phi_W$, and the probability, $p_W$, that that particular URL will be selected next by the user—this flux being very similar to the EVC flux discussed above.

Figure 9:
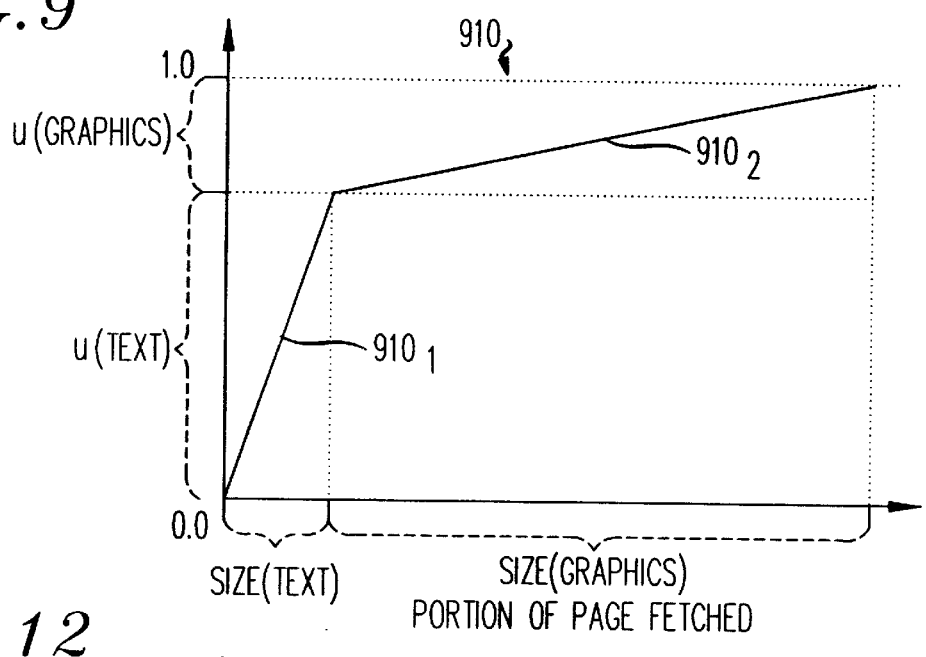
FIG. 9 graphically depicts illustrative function 910 that shows utility, u, to a user as discernible portions of a screenful of a web page, e.g., graphics and text, are each fetched and rendered in succession.

In that regard, consider FIG. 9 which graphically depicts illustrative function 910 that shows utility, u, to a user as discernible portions of a screenful of a web page, e.g., graphics and text, are each prefetched into cache and rendered in succession. For this function, the page is parsed into textual and graphical portions with all the text being collectively prefetched and stored in local cache and rendered before all the graphics are collectively prefetched, stored and rendered. Function 910 is piece-wise linear and formed of segments 910₁ and 910₂ which represent utility for textual and graphical portions, respectively, of that web page, with the slope of each segment representing marginal refinement of the value of the corresponding portion with increasing time.

To implement this strategy, I assume that a size of a page component, e.g., a screenful, accessed over a network is Size(Component) bytes and that the value of this component is a linear function from zero for none of this component being prefetched to Value(Component) for all of the component. If the component is fetched at a transmission rate of R bytes/second, then the total time in seconds to transmit the entire component is simply given by Size(Component)/R. Hence, the rate of change (refinement) in value with time is given by Value(Component) divided by this time. Hence, the expected value flux for this component is given by equation (14) as follows:

$$\text{Expected Value Flux} = \left[\frac{\text{Value (Component)}}{\text{Size (Component)}} \times \text{Transmission Rate}\right] p(URL \text{ fetched} | \text{Evidence}) \quad (14)$$

For those web pages where text is more valuable than graphics and which exhibit a two-segment piece-wise linear utility function similar to function 910, text for each such page, i.e., a predefined amount, associated with a URL would be collectively prefetched and stored before any of the graphics for this text were to be prefetched. This strategy uses either predefined relative weightings, for the rates at which text and graphics manifest increasing value with time to a user, or acquire these weightings from a user, as illustratively discussed below.

In particular, I assume that the total value of a complete fetch of a web page is one and that the value of any portion of graphics or text is a linear function of that portion of graphics or text. The partial value of graphics or text is computed as a product of the portion of the graphics or text of the total pre-specified amount to be fetched and the value of the total amount to be fetched. The rate at which value is delivered to the user is the product of the value of the total graphics or text and the portion of the graphics or text that is delivered per second. This rate can be determined by measuring the transmission speed that occurs during an actual fetch of this portion of the web page or by probing a corresponding web server for this information, should that information be available. Alternatively, a similar transmission rate can be assumed to occur for all URLS. For purposes of simplifying the implementation of this URL retrieval strategy, I will assume that the network bandwidth is the same for all URLs, thereby eliminating this variability.

FIGS. 10A and 10B collectively depict Partial Page—Text before Graphics Fetch Process 1000 which is performed by browser 35 to implement this corresponding text before graphics retrieval strategy. This strategy relies on choosing those URL components for prefetching in an optimal order that maximizes the expected value flux, i.e., maximizes the usage of available processing and network capacity.

In particular, upon entry into process 1000, block 1010 is first executed. This block, accesses, from a stored profile, a definition specifying web page components (also referred to here as "partial results"), e.g., text and graphics, and the relative weightings of each such component. This definition will be used with all web pages that are to be subsequently accessed with this strategy. Next, execution proceeds to block 1020 which determines a set of URLs containing those web pages any one of which being that to which the user is likely to next transition. Execution then proceeds to block 1030 which, using the weightings, assigns a numeric likelihood (probability value) to each of the URLs in the set or to just predefined "key" URLs in that set, such as those, as discussed below in conjunction with FIGS. 15A and 15B, to which the user is most likely to next transition given, e.g., an immediately prior user selection of a control on the rendered page or even position of a mouse pointer or cursor on that page in view of user dwell time at that position. Blocks 1020 and 1030 utilize the user model to construct the set of URLs and assign a probability to each URL therein. Next, block 1040 is executed to assign an average network transmission rate or probe each of the web servers, associated with these URLs in the set, for their specific transmission rate. Once the transmission rate is determined, whether by assignment or server query, execution proceeds to a loop formed of blocks 1050–1090. Upon entry into the loop, execution first proceeds to block 1050 which, for each partial result that exhibits linear utility, calculates the product of the rate of refinement in value with time, i.e., $\phi_W$, for that result and the likelihood of the corresponding page to be accessed next, $p_W$, to yield a corresponding flux product for that partial result. Next, block 1060 executes to sort the page components in the set in descending order of their flux products. Once this occurs, block 1070 executes to fetch data from the URL component then exhibiting the highest flux product. Once the content for this component has been completely downloaded, then this component is deleted from the set. Block 1080 is then executed to update the transmission rate through real-time measurements previously made during execution of block 1070 of the speed at which data was downloaded for this immediately prior URL component. Thereafter, block 1085 executes to visually signify, through the browser GUI and as discussed above, to the user that this component has been prefetched and stored within local cache 656. This block also modifies the visual (color coded) designations for each of the prefetched URL components then residing in the local cache to depict relative latency ("aging") of each of these URL components. Execution then proceeds to decision block 1090 which, when executed, determines whether content for the last URL in the set has been downloaded or a termination condition has occurred. If neither of these events arose, then decision block 1090 routes execution, via NO path 1093, back to block 1050 to recalculate the flux products for the remaining URL components in the set, and so on. Alternatively, if content for the last URL in the set has been downloaded to a predefined result or a termination condition has occurred, then execution exits, via YES path 1097, from process 1000.

As another strategy, a utility function (not specifically shown), similar in shape to function 910 shown in FIG. 9, can be used but rather than valuing text and graphics separately, value can be assigned to each different screenful of information to be prefetched from a URL. As noted above, a web page can provide multiple screenfuls of content. Under this scenario, information from one page, such as page one, is viewed as being more valuable (having greater utility) to a user than information from another page, such as page two and so forth, with each successive page for a URL exhibiting decreasing utility. No discrimination is made between textual and graphical components of any screenful. To implement this scenario, a number of screenfuls of content that are to be fetched from each URL is acquired from a profile, as well as a relative weighting, denoting relative rate of increase in utility with time, for each such screenful. As is the case above with text and graphics, the weightings for the screenfuls can either be predefined or acquired from a user.

In particular, here I assume that the total value of a complete fetch of a web page is one and that the value of any screenful of that page is a linear function of the portion of the full page that has been fetched. Partial value for each screenful, for a web page, is computed as a product of the portion of a total amount of data that needs to be fetched for that page and the weighting for that screenful. The rate at which value is delivered to the user for any given screenful is the product of the weight for that screenful and the portion of that page that is being delivered per second. Here too, for simplification, network bandwidth will be assumed to be the same for all URLs so as to eliminate this source of variability.

Figure 11B:
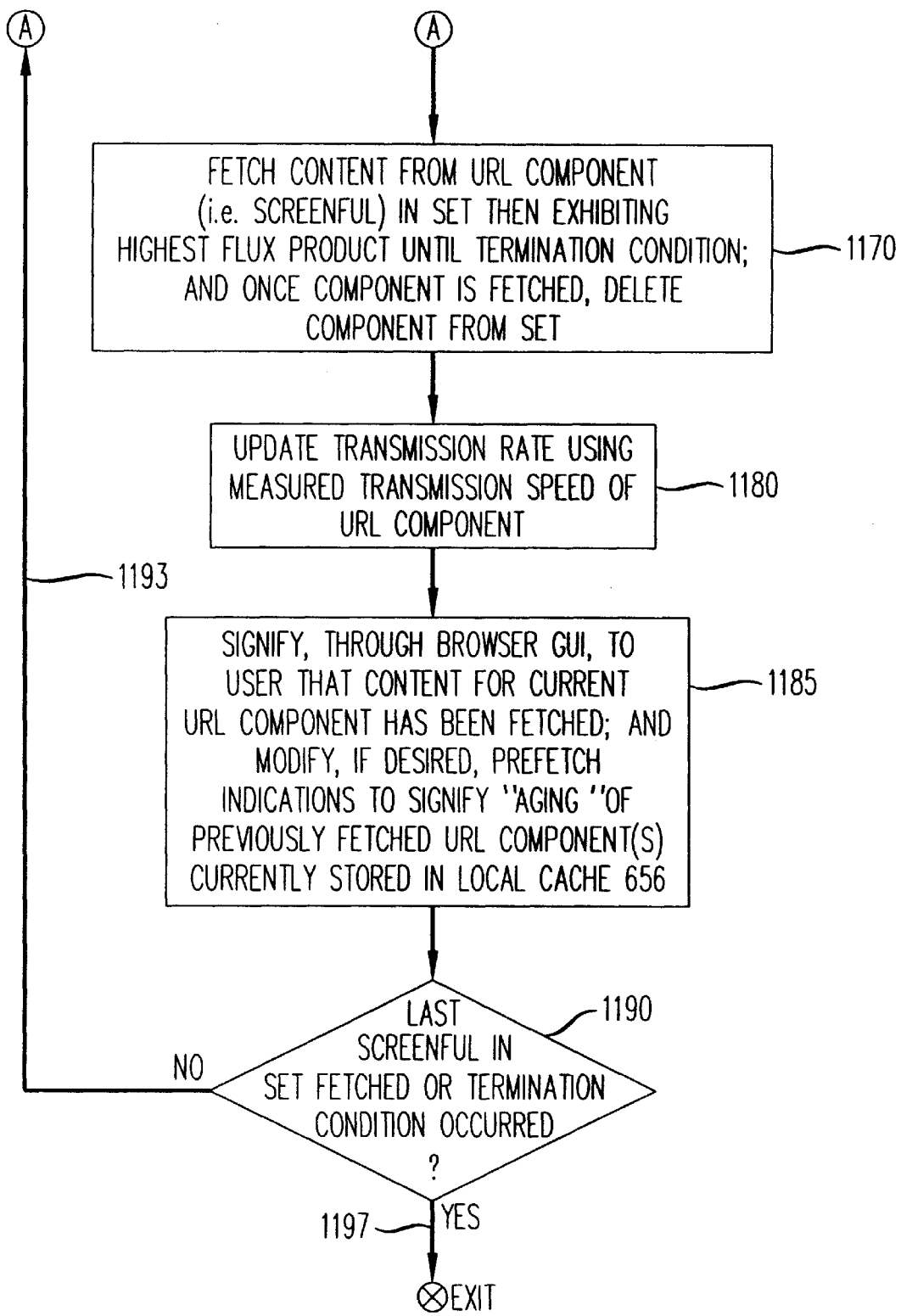

FIGS. 11A and 11B collectively depict Partial Page—Screenful Fetch Process 1100 which is performed by browser 35 to implement this corresponding screenful retrieval strategy. This strategy relies on choosing those screenfuls from a URL for prefetching in an optimal order that maximizes the expected value flux, i.e., maximizes the usage of available processing and network time.

In particular, upon entry into process 1100, block 1110 is first executed. This block, accesses, from a stored profile, a definition specifying web page components (again "partial results"), e.g., here different screenfuls, and the relative weightings of each such component. This definition will be used with all web pages that are to be subsequently accessed with this strategy. Next, execution proceeds to block 1120 which determines a set of URLs for those web pages any one of which being that to which the user is likely to next transition. Execution proceeds to block 1130 which, using these weightings, assigns a numeric likelihood (probability value) to each of the URLs in the set or to just predefined "key" URLs therein, such as those, as discussed below in conjunction with FIGS. 15A and 15B, to which the user is most likely to transition given, e.g., an immediately prior user selection of a control on the rendered page or even position of a mouse pointer or cursor on that page in view of user dwell time at that position. Blocks 1120 and 1130 utilize the user model to construct the set of URLs and assign a probability to each URL therein. Next, block 1140 is executed to assign an average network transmission rate or probe each of the web servers, associated with these URLs in the set, for their specific transmission rate. Once the transmission rate is determined, whether by assignment or server query, execution proceeds to a loop formed of blocks 1150–1190. Upon entry into the loop, execution first proceeds to block 1150 which, for each partial result that exhibits linear utility, here screenful, calculates the product of the rate of refinement in value with time, i.e., $\phi_W$, for that result and the likelihood of the corresponding page to be accessed next, $p_W$, to yield a corresponding flux product for that partial result. Next, block 1160 executes to sort the page components, specifically screenfuls, in the set in descending order of their flux products. Once this occurs, block 1170 executes to fetch data from the URL component, here screenful, then exhibiting the highest flux product. Once the content for this component has been completely downloaded, then this component is deleted from the set. Block 1180 is then executed to update the transmission rate through real-time measurements previously made during execution of block 1170 of the speed at which data was downloaded for this immediately prior URL component. Thereafter, block 1185 executes to visually signify, through the browser GUI and as discussed above, to the user that this component has been prefetched and stored within local cache 656. This block also modifies the visual (color coded) designations for each of the prefetched URL components then residing in the local cache to depict relative latency ("aging") of each of these URL components. Execution then proceeds to decision block 1190 which, when executed, determines whether content for the last URL in the set has been downloaded to a predefined result or a termination condition has occurred. If neither of these events arose, then decision block 1190 routes execution, via NO path 1193, back to block 1150 to recalculate the flux products for the remaining URL components in the set, and so on. Alternatively, if content for the last screenful in the set has been downloaded or a termination condition has occurred, then execution exits, via YES path 1197, from process 1100.

As a further strategy, a piece-wise utility function can be used for a web page that separately values text and graphics contained in a first screenful for individual prefetching, and then separately values text and graphics for each successive screenful in that page for individual prefetching. Such a utility function is graphically depicted by illustrative function 1210 shown in FIG. 12. This function depicts utility, u, to a user as discernible portions of, e.g., two screenfuls of a common web page, e.g., graphics and text, are each prefetched into cache and rendered in succession. As depicted, this utility function illustratively contains segments $1210_1$ and $1210_2$ which depict utility for the textual and graphical components of a first screenful of page content, e.g., for screenful one; and segments $1210_3$ and $1210_4$ which depict the utility for the textual and graphical components of a next successive screenful of page content, e.g., for screenful two, respectively.

With this function, each separate screenful of page content is first parsed into its textual and graphical components with separate screenfuls being fetched in the order of their descending incremental value with, within each screenful, textual components in those screenfuls being collectively fetched before graphical components in those screenfuls. This strategy employs relative weightings to signify rates at which text and graphics for a common screenful of content manifest increasing value with time to a user. While the weightings are similar to those discussed above for partial results, whether text or graphics or separate screenfuls of page content, the weightings here are conditioned on the total utility to be provided by the corresponding screenful of content with respect to a total predefined number of screenfuls of such content or a total quantity of information to be fetched from the corresponding web page. As is the case above, these weightings can be either predefined or acquired from a user in the illustrative manner discussed below. For simplification, the other assumptions applicable to function 910 (see FIG. 9) apply here as well.

Figure 13A:
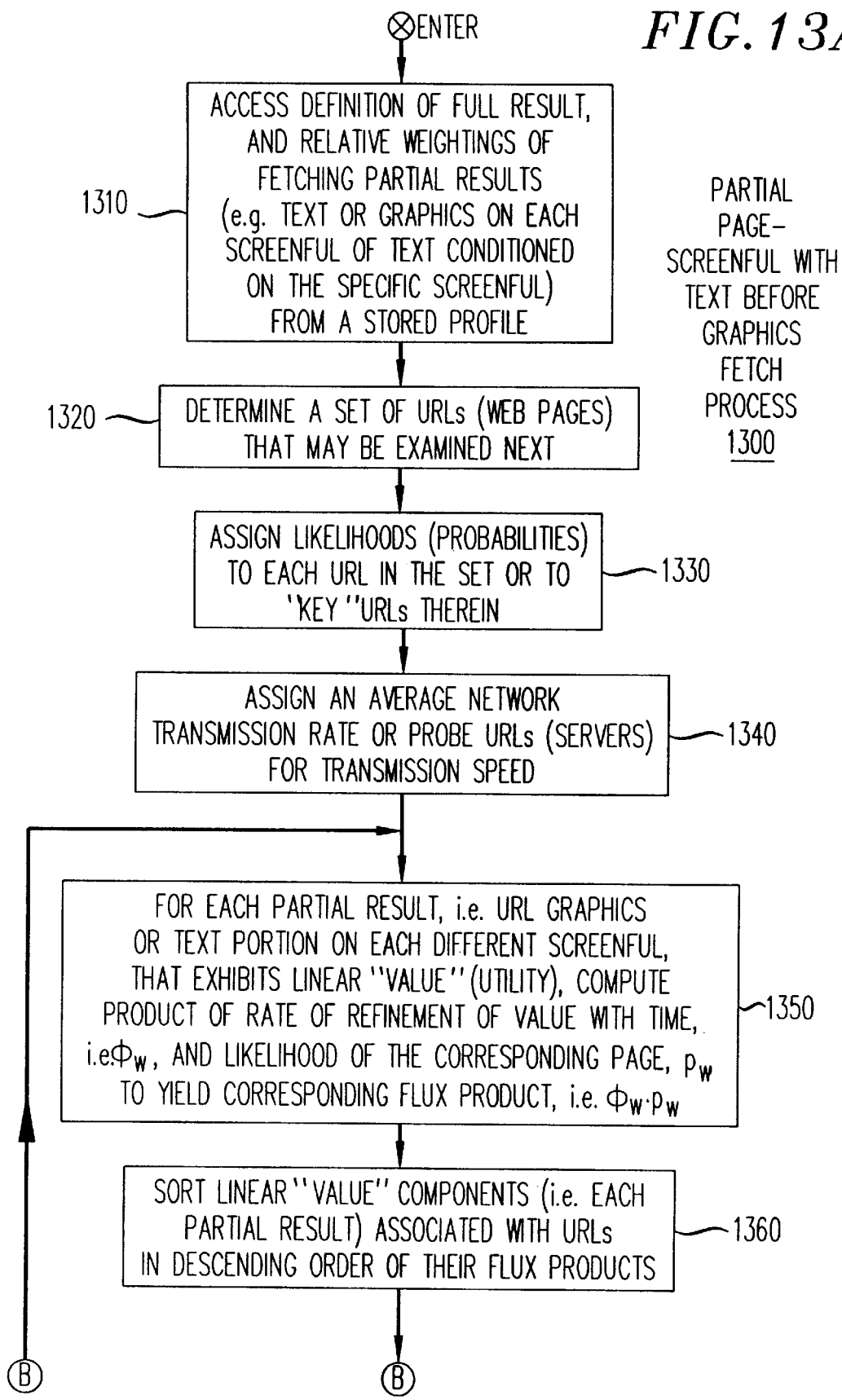
FIGS. 13A and 13B collectively depict a flowchart of Partial Page—Screenful with Text before Graphics Fetch Process 1300 which is performed by browser 35 to implement yet another retrieval URL retrieval strategy in accordance with my inventive teachings, i.e., fetching text in favor of graphics from ordered screenfuls of content.
Figure 13B:
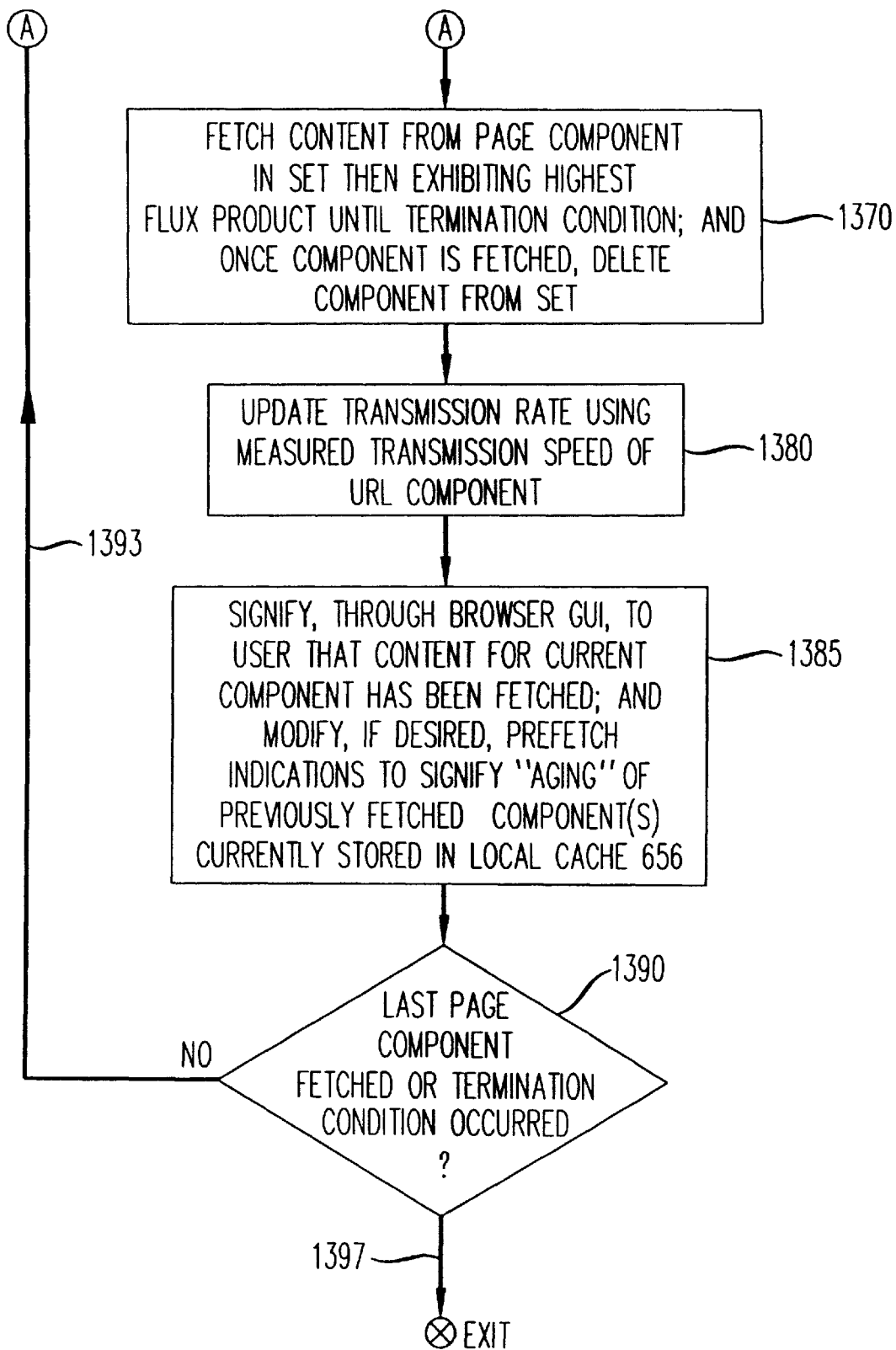

FIGS. 13A and 13B collectively depict Partial Page—Screenful with Text before Graphics Fetch Process 1300 which is performed by browser 35 to implement this corresponding ordered screenful, with text before graphics, retrieval strategy. This strategy relies on choosing those screenfuls, ordered by their flux products, and within each such screenful from a URL, the textual components before the graphical components, for prefetching in an optimal order that maximizes the usage of available processing and network resources.

In particular, upon entry into process 1300, block 1310 is first executed. This block, accesses, from a stored profile, a definition specifying the applicable partial results, i.e., here being different textual and graphical components conditioned on each different screenful (e.g., first screenful, second screenful, etc.) containing those components and the relative weightings of each such partial result. This definition will be used with all web pages that are to subsequently accessed with this strategy. Next, execution proceeds to block 1320 which determines a set of URLs for those web pages any one of which being that to which the user is likely to transition. Execution proceeds to block 1330 which, using these weightings, assigns a numeric likelihood (probability value) to each of the URLs in the set or to just predefined "key" URLs in the set, such as those, as discussed below in conjunction with FIGS. 15A and 15B, to which the user is most likely to transition given, e.g., an immediately prior user selection of a control on the rendered page or even position of a mouse pointer or cursor on that page in view of user dwell time at that position. Blocks 1320 and 1330 utilize the user model to construct the set of URLs and assign a probability to each URL in that set. Next, block 1340 is executed to assign an average network transmission rate or probe each of the web servers, associated with these URLs in the set, for their specific transmission rate. Once the transmission rate is determined, whether by assignment or server query, execution proceeds to a loop formed of blocks 1350–1390. Upon entry into the loop, execution first proceeds to block 1350 which, for each partial result that exhibits linear utility, calculates the product of the rate of refinement in value with time, i.e., $\phi_W$, for that result and the likelihood of that corresponding page to be accessed next, $p_W$, to yield a corresponding flux product for that partial result. Next, block 1360 executes to sort the page components, specifically text and graphic components for each screenful of each page, in the set in descending order of their flux products. Once this occurs, block 1370 executes to fetch data from the URL component then exhibiting the highest flux product. Once the content for this component has been completely downloaded, then this component is deleted from the set. Block 1380 is then executed to update the transmission rate through real-time measurements previously made during execution of block 1370 of the speed at which data was downloaded for this immediately prior URL component. Thereafter, block 1385 executes to visually signify, through the browser GUI and as discussed above, to the user that this component has been prefetched and stored within local cache 656. This block also modifies the visual (color coded) designations for each of the prefetched URL components then residing in the local cache to depict relative latency ("aging") of each of these URL components. Execution then proceeds to decision block 1390 which, when executed, determines whether content for the last page component in the set has been downloaded to a predefined result or a termination condition has occurred. If neither of these events arose, then decision block 1390 routes execution, via NO path 1393, back to block 1350 to recalculate the flux products for the remaining page component (s) in the set, and so on. Alternatively, if content for the last page component in the set has been downloaded or a termination condition has occurred, then execution exits, via YES path 1397, from process 1300.

Thusfar, to simplify the above discussion, I have implicitly assumed that network idle time merely relates to a notion that a particular user's network connection is itself idle. Such a condition occurs when, e.g., that user either is then reviewing a web page that has been previously downloaded and is now fully rendered or is performing a different non-networked task through his(her) personal computer. In either of these instances, the user's personal computer is not using any current network resources; hence, as far as that user is concerned, the network is then idle. However, as will be shortly discussed below, the concept of network idle time is not so limited and encompasses available capacity across the entire network or a portion of that capacity.

Moreover, a user can initiate any one of a number of different tasks through his personal computer, other than just downloading web pages, that nevertheless utilize network bandwidth. These tasks include, e.g., undertaking work with directory service, sending and receiving e-mail messages, video-streaming and others, and will present a load to the network. If the user were to initiate any such task, prefetching could be halted during the pendency of that task so that available and appropriate network resources could be dedicated to that particular task. Alternatively, if some degree of prefetching should continue and sufficient network resources then existed, those resources could be allocated, in some fashion, between prefetching and another network-based task then being executed such that both that task and web page prefetching could simultaneously occur.

To determine whether sufficient network bandwidth then existed to support the user, the user's personal computer could appropriately probe the network, as discussed above, to assess whether it could allocate sufficient bandwidth to that user, and/or monitor current networking activity at that particular personal computer.

Beyond assessing available network capacity at a client personal computer, overall measures of global network activity, such as across a corporate local area network (LAN), can also be assessed. Such assessments could be readily accomplished by probing the network through a client computer. In this case, the resulting data would indicate a level of networking activity that then existed throughout the entire network. Prefetching would then be initiated at each client computer only when sufficient idle capacity then existed, across the entire network, to support prefetching. Alternatively, if sufficient network capacity did not then exist to support prefetching at all client computers, then prefetching could be initiated at just predefined group of the client computers, with the size of the group being appropriately adapted in real-time to match the network bandwidth then available for prefetching.

Testing the network for its available capacity prior to initiating prefetching could be used to advantageously suppress any extra network usage that would otherwise be occasioned by prefetching when, given current utilization of the network, such extra usage would unduly burden the network or prove too costly to accommodate given other network tasks then occurring.

As to assessing transmission rate for a given server, default values can be assigned for transmission rates for different specific web servers located at different locations. These default values would be based on a prior assessment of the actual rate and be stored in a table. These values would likely vary with two factors. First, transmission rates are adversely influenced as a geographic distance between a server and a requesting client computer increases. Fortunately, many URLs contain country suffixes which identify its siting country, e.g., URL country suffixes ".au", ".uk" and ".ca" denote Australia, United Kingdom and Canada, respectively. Second, from a standpoint of network traffic within that country, transmission rates vary significantly with a local time of day at which a server in that country is accessed; with increased (decreased) transmission times generally being provided at night or at other times when local network loading is expected to be relatively low (high). Hence, the table can contain default values for transmission rates for web servers located in different countries and for different local access times. As such, when a user accesses and downloads a web page from a particular server (or a server in a particular geographic area, such as a given country), a default transmission rate would first be accessed from the table for that server (or area), given the country identified in the corresponding URL and the local time of day. That value would then be initially used in conjunction with equation (14), as discussed above, to determine expected value flux. While a download were progressing, the client computer would meter the actual data flow. Based on resulting real-time measurements, the client computer would continually update the transmission rate to reflect the actual transmission rate and use the updated value(s) during the remainder of the download to provide increasingly accurate assessments of flux associated with continuing the download. The default value in the table could be changed to reflect the updated value(s). Hence, those servers that, in actuality, provide relatively slow or fast transmission rates would be associated with correspondingly low or high flux values, respectively, for prefetching additional pages from those servers.

Clearly, by now, those skilled in the art will readily realize that a wide variety of predefined utility functions, other those typified by functions 720, 910 and 1210, can be readily constructed to depict utility for a given web page.

Moreover, browser 35 can utilize a predefined web page utility function as a default but provide a user with a limited ability to modify any linear piece-wise or other portion of the utility function, such as by increasing or decreasing a relative weighting of that portion, e.g., the portion associated with text, over another portion of the function, e.g., that associated with graphics and/or any other web page component. Specifically, a user could enter his(her) preference for each web page component and modify a relative weighting of a functional component of a web page, e.g., for rendering text before graphics, through a suitable menu "option" in the browser that accommodates user changes to default values. Such a change could occur by, e.g., a user clicking a button to select a predefined numeric value in a dialog box or by specifying a relative quantitative amount through appropriate manipulation of either a mouse-based slider or other user-settable range control. Alternatively, an author of a web page may define a particular utility function and link a file for that function for automatic download from the web server as soon as the page is first accessed by the browser in the client computer such that the function can be used by component 650 (see FIG. 6) to control the order through which portions of that page are then prefetched. Furthermore, this file could alternatively contain appropriate modifications, as developed by an author of that page, to a default utility function embedded in the browser so as to tailor the default function to a particular order through which portions of that page are to be prefetched.

Apart from choosing different web page components, e.g., textual or graphics or individual screenfuls of a common page, to prefetch—as discussed above in the illustrative context of FIGS. 7, 9 and 12, on a fundamental level, my present invention also encompasses the concept of prematurely terminating or, at least slowing (retarding), the prefetching of any web page, i.e., a current information download, in favor of prefetching a web page that will be accessed in the future, such as during the current session or within a given time horizon, where the expected refinement in the rate of change in utility (incremental utility) to the user in prefetching the future page is greater than the incremental utility associated with continuing the current information download. Generally speaking, this involves deallocating computational or networking resources from the current information download and allocating (assigning) those resources to prefetching and storing the future web page. This inventive concept is particularly advantageous in terminating an information download which provides diminishing utility to a user in favor of fetching a different page of greater interest.

In particular, consider a user who is downloading and successively rendering detailed screenfuls of a web page. That user may find that after only a few such screenfuls, out of many more available to download for the page, that (s)he has no interest in the remainder of the page. In this instance, as conventionally occurs, the user would need to manually terminate the download and then select another URL of interest which will be fetched and rendered in turn; hence, disadvantageously waiting for the latter page to be fully fetched and rendered by the browser. Oftentimes, a user will skim the top portions of a few successive screenfuls, but will examine the entire page before transitioning onward to another page of interest.

Through my present invention, browser 35, through use of, e.g., a probabilistic user model, can compare rate of refinement in utility provided by a current information download, i.e., a web page currently being downloaded, and compare that rate against a discounted flux-product, as generally discussed above in conjunction with FIG. 4C, associated with a web page to which the user is likely to transition in the future (i.e., a "future" web page). Whenever the discounted flux-product of the latter page exceeds the rate of refinement with time then being provided by continuing to download the former page, downloading of the former is terminated in favor of then prefetching the latter. In that regard, the former page can be that which is currently being fetched and rendered or even being prefetched for subsequent rendering. Moreover, generally speaking, the current task being prematurely terminated need not be limited solely to a task of downloading and rendering a web page, but instead can be any of a wide variety of interruptible computational tasks for which a rate of refinement in value to a user can be ascertained.

Figure 17A:
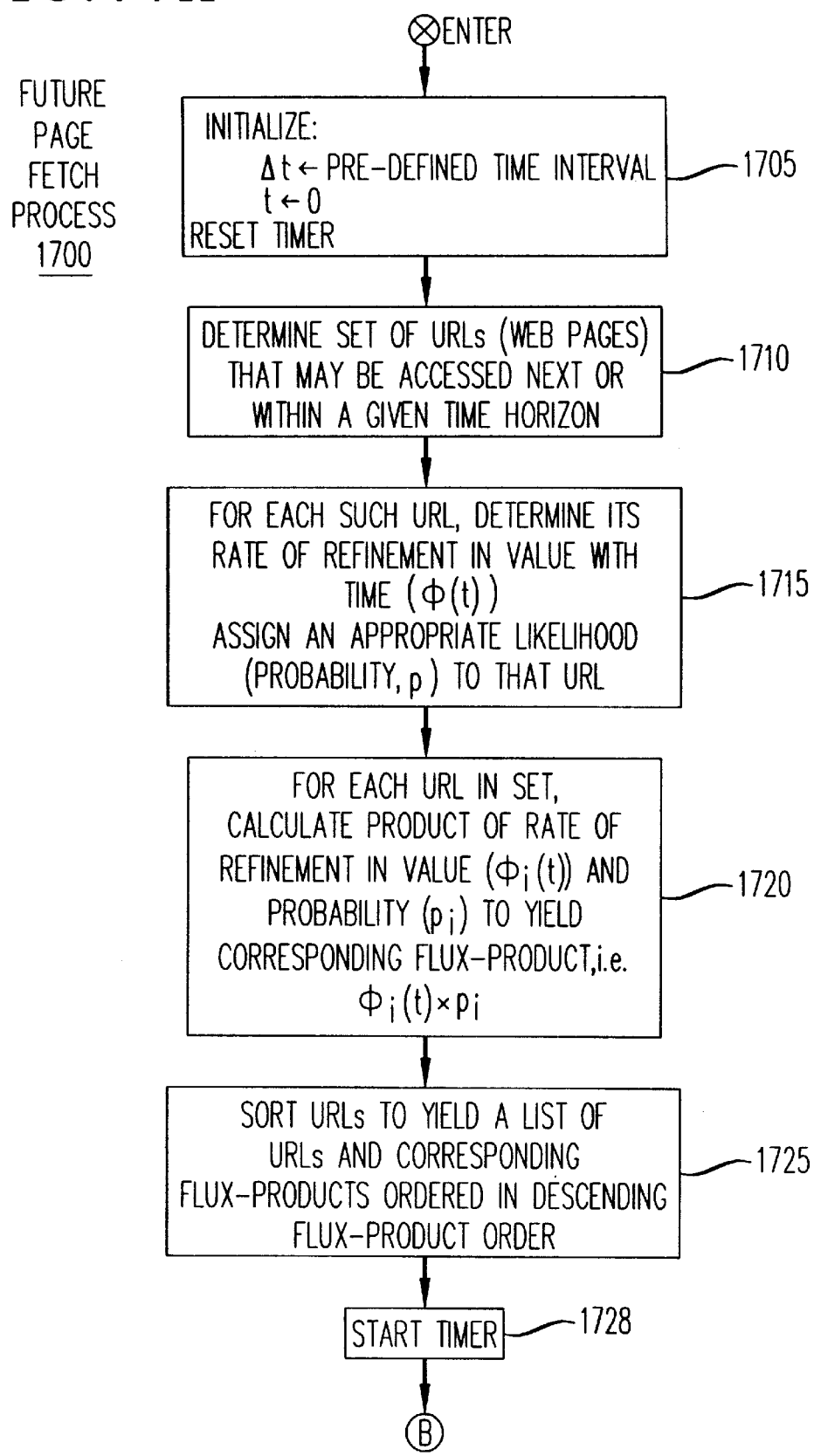
FIGS. 17A–17C collectively depict a flowchart of Future Page Fetch Process 1700 which is illustratively performed by browser 35 to prematurely terminate the fetch of, e.g., a current web page in favor of fetching a future web page where the expected refinement in the rate of change in utility (incremental utility) to the user in prefetching the future page is greater than the incremental utility associated with continuing to download the current page.
Figure 17B:
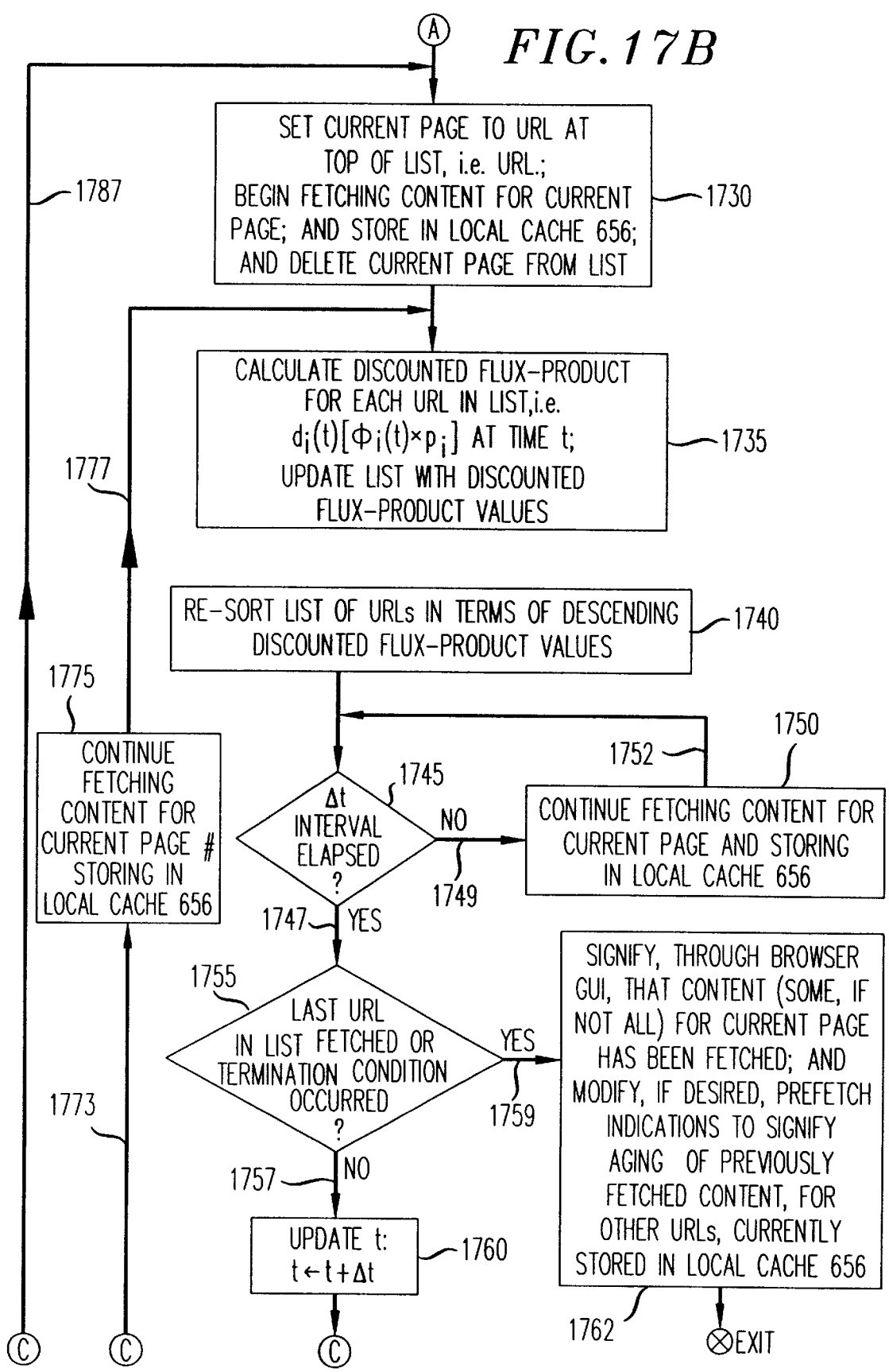
Figure 17C:
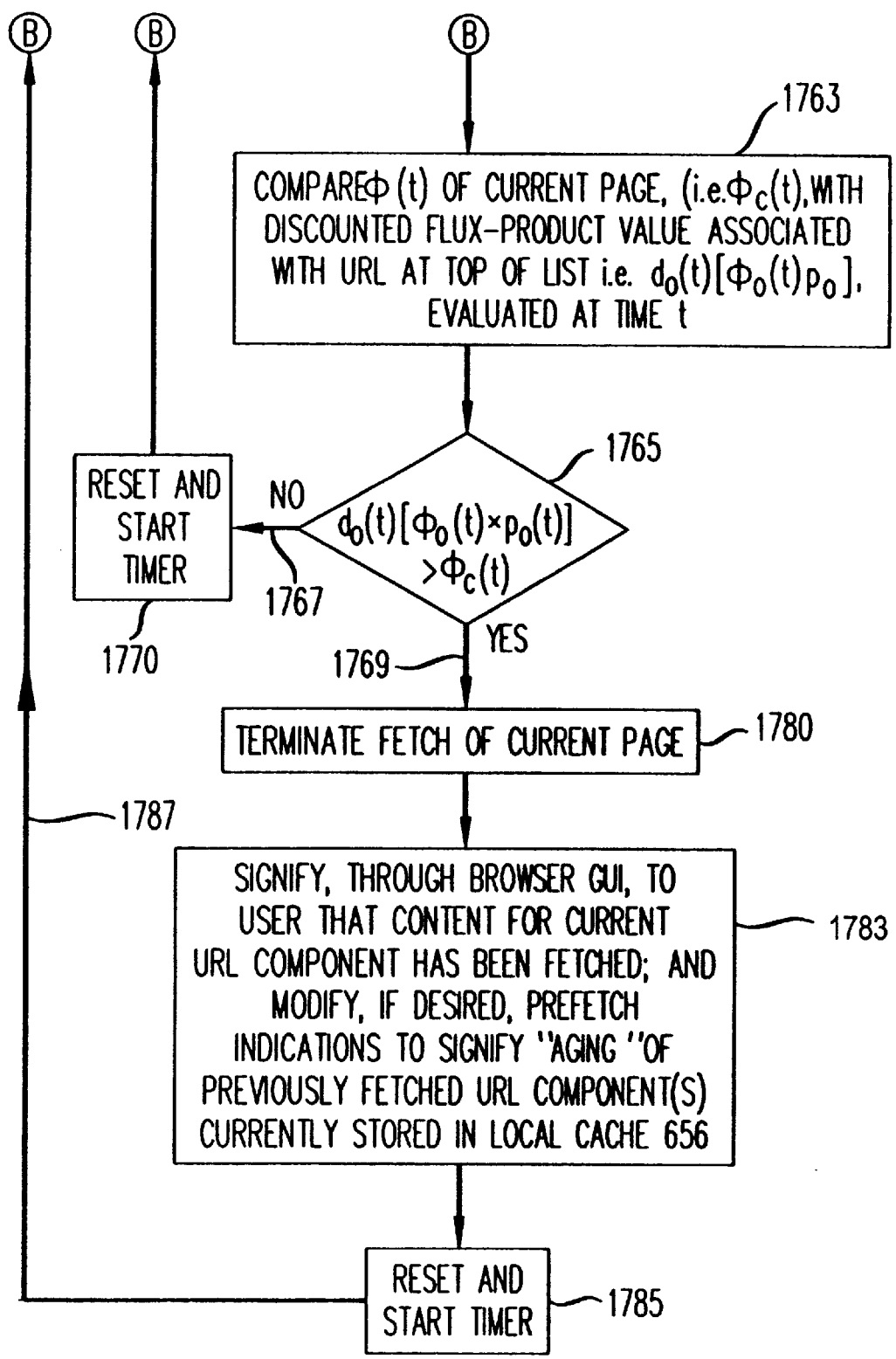

With this in mind, FIGS. 17A–17C collectively depict a flowchart of Future Page Fetch Process 1700 which is performed by browser 35. Illustratively, process 1700 prematurely terminates the fetch of, e.g., a current web page in favor of fetching a future web page where the expected refinement in the rate of change in utility (incremental utility) to the user in prefetching the latter exceeds the incremental utility associated with continuing to fetch the former page. For purposes of simplification, process 1700 fetches full web pages, without discriminating on a flux-product basis, between individual page components in those pages. After considering this process and processes 800, 1000, 1100 and 1300 described above in conjunction with FIGS. 8, 10A–10B, 11A–11B and 13A–13B, respectively, anyone skilled in the art could readily modify process 1700 to terminate a fetch of a present web page or component of that page in favor of fetching a component of a future web page (i.e., a future web page component).

In particular, upon entry into process 1700 (shown in FIGS. 17A–17C), execution first proceeds to block 1705. This block, when executed, initializes a time interval to a predefined time interval, Δt, sets =variable t to zero, resets a timer to zero and clears local cache 656 (see FIG. 6). Thereafter, as shown in FIGS. 17A–17C, execution proceeds to block 1710. This block, determines typically through accessing a user model and given user present interaction with, e.g., a web page then rendered by the browser, a set containing URLs for web pages, each of which is likely to be accessed next by the user either during the current session or within a given time horizon. Once this occurs, execution proceeds to block 1715 which, for each URL in the set, determines a corresponding rate of refinement in value with time, i.e., ($\phi(t)$). As discussed above, for any given web page, this rate can be estimated, e.g., as a linear function of a total amount of content to be downloaded in that page, based on an average or actual network transmission speed, or accessed from a stored time dependent function (non-linear or linear) associated with that web page. Illustratively, the latter function may be stored within hypertext code for a prior web page and specifically associated with a link to the given web page or separately downloaded as a file specified by this hypertext code and associated with the link. In any event, the specific manner through which this function is obtained is irrelevant to process 1700 and will not be discussed further. In addition, block 1715 also assigns, for each URL in the set and through the user model, an appropriate estimate of the likelihood (probability, p) that the user will next transition to this URL. Thereafter, execution proceeds to block 1720 which, for each URL in the set, calculates a corresponding flux-product value as being a product of the rate of refinement in value and the corresponding transition probability. Once this occurs, execution proceeds to block 1725 which, when executed, sorts the URL in the set, in terms of their flux-product values, to yield a list of URLs, and associated flux-product values, ordered in descending flux-product order. Thereafter, block 1728 executes to start the timer. This timer is used to time interval Δt. The length of this interval specifies a time period that must elapse between a time when the rate of refinement in value with time of an information download then occurring is compared against the discounted flux-product values for all the future pages then in the list, and a time when these comparisons next occur.

Execution next proceeds to block 1730. This block, when executed, identifies a current page, i.e., $URL_C$, that is to be fetched as the URL then situated at the top of the list, i.e., $URL_0$. Once this occurs, block 1730 then begins fetching content stored at this URL and rendering it accordingly. Block 1730 also removes this particular URL from the list. Thereafter, block 1735 executes to calculate a discounted flux-product value, i.e., $d_i(t)[\phi_i(t)p_i]$ wherein $d_i(t)$ is a time dependent discount factor, for each URL, i.e., $URL_i$, then remaining in the list. Recognizing that utility of a future page to a user diminishes as increasing amounts of time elapse until that page is ultimately fetched and rendered, the discount factor manifests a predefined time dependency rather than remaining fixed as was the case with equation (13) discussed above. Once all the discounted flux-products have been determined, the entries in the list are updated to reflect their discounted flux-product values rather than the non-discounted flux-product values ascertained through block 1720. Thereafter, execution proceeds to block 1740. This latter block re-sorts the list in terms of descending discounted flux-product values.

Execution then proceeds to decision block 1745 which determines whether time interval Δt has elapsed, i.e., whether the timer has reached the end of its timing interval. If this interval has not elapsed, then decision block 1745 routes execution, via NO path 1749, to block 1750. This latter block continues fetching content for the current web page and storing that content into local cache 656. Execution, then effectively loops back to block 1745, via path 1752, and so forth until the time interval elapses. When this interval elapses, decision block 1745 routes execution, via YES path 1747, to decision block 1755. This latter decision block determines whether content for the last URL in the list has been fetched or a termination condition has occurred. If either of these events arose, then execution proceeds, via YES path 1759, to block 1762. This block, when executed, visually signifies, through the browser GUI and as discussed above, to the user that content for the current page has been prefetched and stored within local cache 656. This block also modifies, if desired, the visual (color coded) designations for each of the prefetched pages then residing in the local cache to depict their relative latency. Thereafter, execution exits from process 1700. Alternatively, if neither of these events arose, then decision block 1755 routes execution, via NO path 1757, to block 1760. This latter block updates variable t to reflect the passage of time interval Δt. Thereafter, execution proceeds to block 1763 which, when executed, compares the flux value of the current page, i.e., $\phi_C(t)$, then being downloaded, i.e., $URL_C$, with the discounted flux-product value of the URL, associated the future web page, then situated at the top of the list, i.e., $d_0(t)[\phi_0(t)p_0]$. Inasmuch as the current web page is then being downloaded, the transition probability associated with this page is therefore one. Consequently, the flux-product for this page equals its rate of refinement in value with time. Hence, comparison is simply made against the rate of refinement for this page. Decision block 1765 then determines whether the current information download is to be terminated in favor of fetching content for the future web page.

If the value for the discounted flux-product for the future web page, evaluated at time t, is less than or equal to the rate of refinement in value, also evaluated at time t, provided by the present information download, the present information download continues. In this case, decision block 1765 routes execution, via NO path 1767, to block 1770. This latter block resets the value of the timer to zero and then starts the timer to time the next Δt interval. Once this occurs, execution proceeds, via path 1773, to block 1775 to continue fetching content for the current web page and storing the content, so fetched, into local cache 656. Execution then loops back, via path 1777, to block 1735 to calculate the discounted flux-product values, given the new time value, for all the URLs then in the list, and so on.

Alternatively, if the value for the discounted flux-product for the future web page, evaluated at time t, exceeds the rate of refinement in value, also evaluated at time t, provided by the present information download, then the present information download is prematurely terminated in favor of fetching content for the future web page. In this case, decision block 1765 routes execution, via YES path 1769, to block 1780. This latter block, terminates the fetch operation for the current information download. Thereafter, execution proceeds to block 1783. This block, when executed, visually signifies, through the browser GUI and as discussed above, to the user that content for the current page has been prefetched and stored within local cache 656. This block also modifies, if desired, the visual (color coded) designations for each of the prefetched pages then residing in the local cache to depict their relative latency. Thereafter, block

1785 executes to reset the timer to zero and then start it once again. Thereafter, execution loops back, via path 1787, to block 1730 which, in turn, identifies a current page, i.e., $URL_C$, that is to be fetched as the URL then situated at the top of the list, i.e., $URL_O$, and then begins fetching this page, and so forth.

Rather than prematurely terminating a download of a current page then being rendered, process 1700 could be readily modified to terminate prefetching and caching of a given web page (or component or screenful(s) of that page) in favor of then prefetching and caching another web page (or component or screenful(s) of that page) whenever the latter exhibits a larger discounted flux-product than does the former. Specifically, the browser could successively prefetch and cache just those portions or screenful(s) of successive pages that provide sufficient incremental value to the user and, once cached, provide suitable visual indications (in any of the illustrative manners discussed above) of each such portion or screenful, and not consume computation and network resources prefetching other portions or screenful(s) of these pages in which the user is likely to have little or no interest. As noted above, many users often skim a top portion or a screenful or two of a web page to determine if the remainder of the page is germane to their current needs and, if it is not germane, then jump to another page that might be of interest before the former has fully downloaded. By relying on user behavior incorporated into a user model, the browser could prefetch and cache just the tops, e.g., a first few inches, or predefined screenfuls of successive web pages in order of their discounted flux-products and ignore the remainder of the those pages. Should the user actually transition to any such prefetched page, then once the corresponding prefetched portion is accessed from cache and rendered, the user could then appropriately instruct the browser to fetch the remainder of the page. In the meantime, the browser could then be successively and selectively prefetching and caching portions or certain screenfuls, of other web pages, which would each provide sufficient incremental value to the user and to which the user is likely to next transition. Here too, the browser would provide a suitable visual indication of each such portion or screenful once it has been cached.

E. Information for specifying a set of URLs for likely user access

As discussed above, the user model specifies for a current web page, in terms of its URL, a set of web pages, in terms of their URLs, any one of which being that to which the user is most likely to access next (i.e., transition to next). This user model can be based on, e.g.: one or more functions, typically probabilistically-based, that collectively forecast user activity; on statistical usage log data, or a combination thereof. As will be discussed in detail below, a probabilistic user model can take into account any of a wide variety of factors, not just a conditional probability of page access given a current page being rendered. Generally speaking, these factors can include, e.g.: (a) structure and layout of information, textual and graphics, in a rendered page (including, e.g.: a manner through which links are highlighted or displayed, such as their position and graphic associations/attachments, and particular words displayed in the links themselves; or, particular words either by content or appearance thereof in a title of a page or in a summary thereof in a rendered page); (b) information regarding background of a user (e.g., age and interests of that user as obtained from a profile stored locally in a client computer or accessed from a remote source, such as the server); and (c) various factors reflective of current interaction between a user and his(her) browser.

1. Statistical usage log data

As noted above, a usage log for a web site can be readily processed through conventional statistical analysis to define, for a given web page, which a user is currently accessing from that site, a set of web pages that includes a page (generally on that site) to which the user is next likely to transition.

Figure 14:
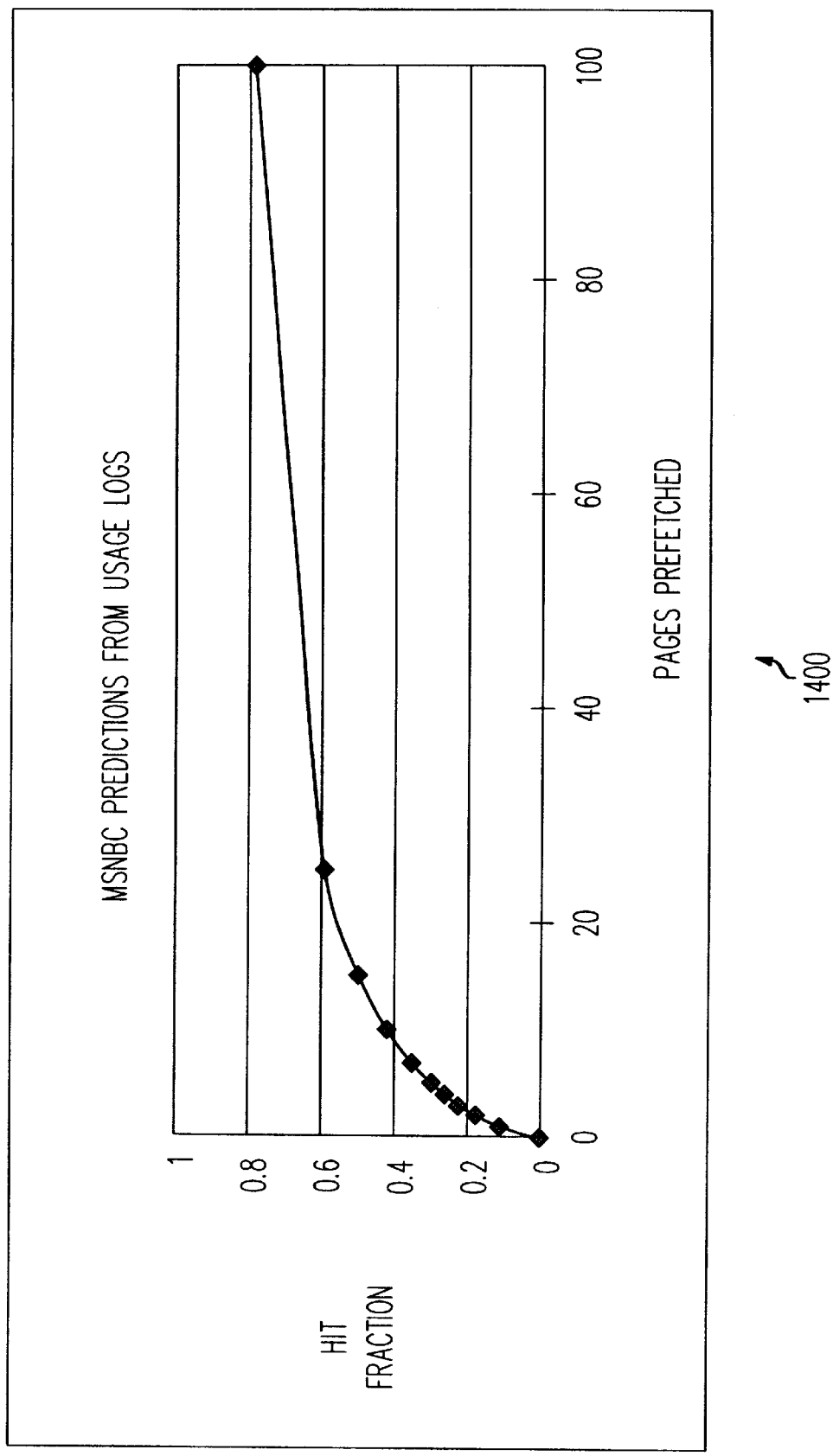
FIG. 14 graphically depicts empirically determined probability (expressed as a "hit fraction" and based on usage log data for a day), for a user then viewing a current web page on an MSNBC web site on that day, of a next successive page then selected by that user having been prefetched and stored in cache, as a function of a number of such pages that, based on transition probabilities across all such users, would then have been prefetched and stored in order of their likelihood of being accessed next.

In this regard, FIG. 14 graphically depicts empirically determined probability function 1400 (expressed as a "hit fraction" and based on usage log data for a day), for a user then viewing a current web page on an MSNBC web site on that day, of a next successive page then selected by that user having been prefetched and stored in cache, as a function of a number of such pages that, based on transition probabilities across all such users, would then have been prefetched in rank order of their probabilities of being accessed next and then stored. As can be seen from the MSNBC usage data underlying this figure, for this site a probability of approximately 0.5 exists of having a page in local cache if approximately 15 pages are prefetched in order of their likelihood, as discussed above, of being accessed next. Hence, with this result, each page in the MSNBC site would have associated with it a list of approximately 15 rank ordered URLs which, once the former page was accessed, would then be prefetched during intervals of low processing and low network activity. Clearly, to increase the probability of a successful prefetch, i.e., defined by a page next being accessed having been prefetched into local cache, a larger set of pages for rank ordered URLs can be prefetched for each page that is currently accessed. However, practical limitations, such as the available processing time in the client computer and network capacity, may effectively limit the number of pages in a set to be prefetched.

2. Transition probabilities based on user interaction with currently rendered page Improved probabilistic-based user models can include a separate conditional probability predicated on each different possible future action, given a user's current action with a displayed page, through which that user can next interact (or not) with that page itself or the browser itself as it displays that page. These possible future actions, for which separate conditional probabilities can be defined, arise through, illustratively: standard interface options (choices) then available to the user through the browser, such as through a toolbar and menus associated with the browser; links then being displayed in situ on a screenful then being viewed and configuration of these links; links then being presented to the user based on an inference made (such as through a conventional statistical approach for inducing a user's interest from data about the interests of multiple people, this approach being known to those skilled in the art as "collaborative filtering," e.g., as discussed below), given the user's last action, as to what that user's next request or action will be; a mode in which results of interest to a user are currently displayed such as through preview windows enabling user selection of any such window for further information on any such result; and user interaction with the rendered page. This interaction can be actual, as in the case of measuring user dwell, pauses in user movement of a mouse and coincident mouse position relative to a page then being rendered to a user; or estimated, as in the case, of statistical measurements of user gaze patterns (as described in detail below), taken across a user community, relative to a rendered page and information then displayed on that page. Collaborative filtering techniques, which model interests of users as a function of materials, i.e., here URLs visited, can provide valuable inputs to a probabilistic user model. In addition, higher-levels of user activity can be utilized to form conditional transition probabilities. This activity can include potentially longer-term user interactivity, e.g., all the pages which the user has successively selected and rendered within a relatively short time horizon extending, such as, e.g., over a current session, or within a longer time horizon, such as a multiple sessions that previously occurred during the last few days or further back into the past.

In particular, user models can utilize, as input parameters, predefined attributes of a web page, such as structure, layout and class of web pages, and/or distinctions about behavior of a given user. Transition probabilities can be learned by a probabilistic user model, such as one employing a Bayesian network, in the following general manner. First web pages can be clustered into classes. Each link of each such page can be tagged in terms of a class associated with that link, e.g.: a highlighted word or a title; a link appearing in a title graphic; a link highlighted by an icon; position of a link (such as where the link appears: on a main page, in a separate column, how far up or down is the link situated relative to a central point of user attention); how early in the page does the link appear; context of that link; and so forth with respect to other class distinctions. The model can also take into account sequences of page transitions, in terms of, e.g., a current page as well as transitions by the user to other pages in succession, as well as maintain information about user behavioral distinctions, such as mouse position, scroll position, recent URL access behavior, a current task at hand and so forth. This information is applied, as input, to the user model in order to appropriately adapt parameters associated with a Bayesian network or specializations adapted for temporal transitions, such as a Hidden Markov Model, employed in the user model. Thereafter, at run time, the model, given appropriate input data, is employed to assign likelihoods (transition probabilities) to various alternate pages (or page components) from which one or more will be selected to then be prefetched.

Figure 15A:
FIG. 15A depicts illustrative display 1500 from a web browser, such as browser 35 shown in FIG. 6, that provides preview windows 1520 and collaborative filtering output 1530 for recommendations to a user.
Figure 15B:
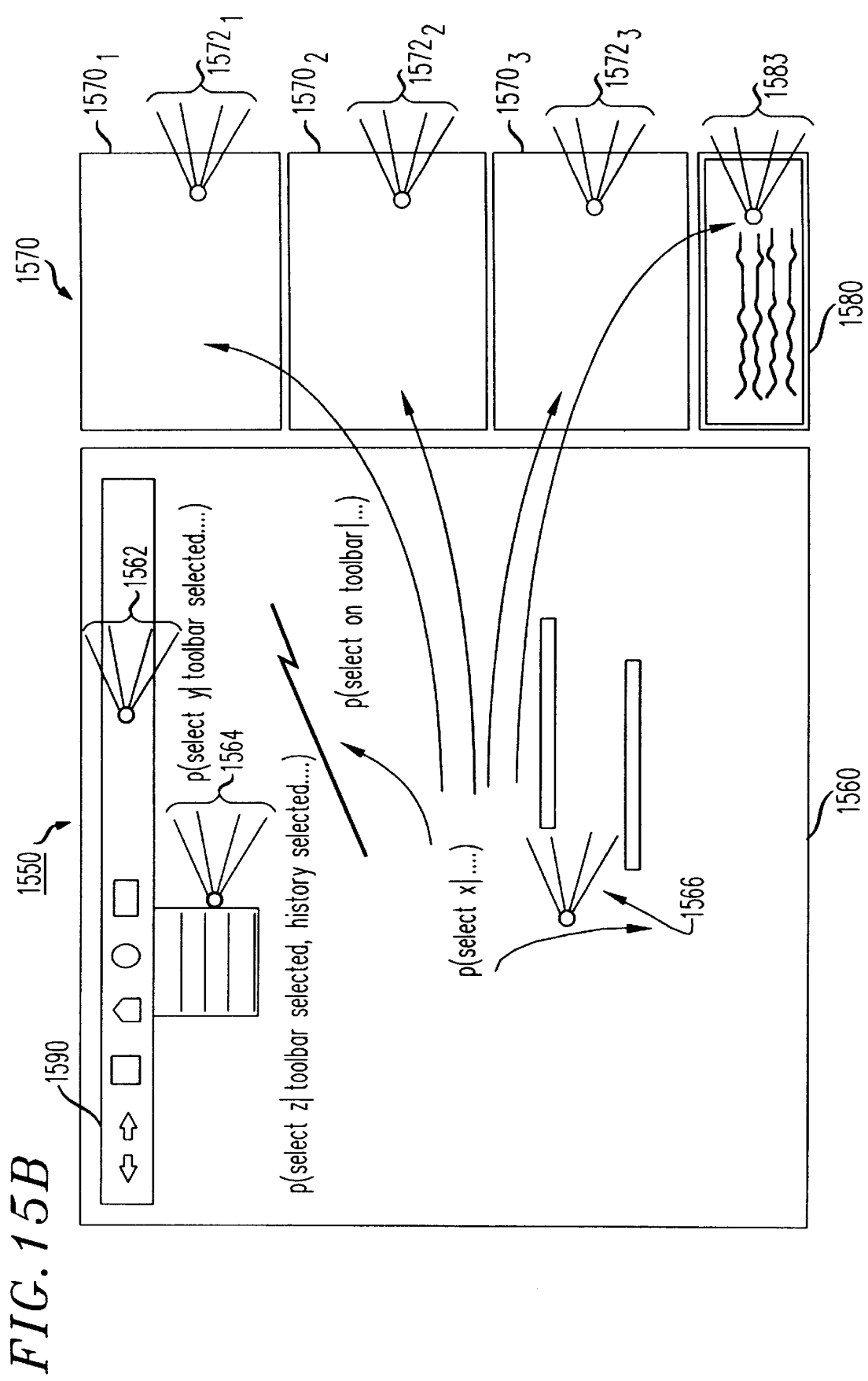
FIG. 15B depicts abstraction 1550 of display 1500 that illustrates various transition probabilities associated with this display.

To appreciate how various additional conditional probabilities can be added to a user model, consider FIG. 15A which depicts illustrative display 1500 from a web browser, such as browser 35 shown in FIG. 6, that contains preview windows 1520, and collaborative filtering output window 1530 which provides recommendations to a user. The reader should also simultaneously consider FIG. 15B which depicts abstraction 1550 of display 1500 that illustrates various transition probabilities associated with this display.

As can be seen, particularly from abstraction 1550, a user viewing main display window 1510, preview windows 1520 having separate preview windows 1520$_1$, 1520$_2$ and 1520$_3$, and collaborative filtering window 1530 can interact with the browser through quite a number of ways. For example, toolbar 1540 located at the top of the rendered display can, as indicated in abstraction 1590, present a number of options, among which the user viewing a current page, can select. For example, from anywhere on a page, the user can then select a control icon on a toolbar by moving a mouse pointer to it and then "clicking" on it. For example, after viewing a page, the user could click on an appropriate directional control icon to either jump "forward" or "back" to a page(s) rendered after or before the current page, click on a search icon to jump to a web search engine, or click on a "favorite" icon to access one of that user's favorite pages then having a URL stored in the browser as a bookmark. Hence, conditional probabilities of the form of, e.g., p(select on toolbar| . . . ) and p(select y| toolbar selected), can be defined for the toolbar as well as each of these toolbar icons given a present position of a mouse pointer within main display window 1510 or on the toolbar itself, respectively. The latter probabilities are symbolized by probability grouping 1562. Also, conditional probabilities, of an illustrative form p(select z| toolbar selected, history selected . . . ) and symbolized by probability grouping 1564, can also be defined for each different menu selection among which a user can then choose, such as "History", selectable through a main command category, such as "Go", among a toolbar list of "File", "Edit", "Go" and "Favorites". Furthermore, a web page itself as shown in main display window 1510 may itself provide fields, such as hotlinks, which a user can select and therethrough transition to another web page or to one of preview windows 1520 or collaborative filtering window 1530. A conditional probability of an illustrative generalized form p(select x| . . . ) as symbolized by probabilities 1566, where " . . . " represents position of a mouse pointer at each of these hotlinks, is used for each of these particular transitions. Furthermore, if the user positions his(her) mouse pointer within preview windows 1520, then, as shown in abstractions 1570 (having abstractions 1570$_1$, 1570$_2$ and 1570$_3$ for preview windows 1520$_1$, 1520$_2$ and 1520$_3$, respectively), or within collaborative filtering window 1530 (having abstraction 1580), conditional probabilities are symbolized by corresponding probability groupings 1572$_1$, 1572$_2$ and 1572$_3$, and 1583, for each web page to which the user can transition from each of these windows. Conditional transition probabilities can also account for the position of a corresponding user selectable field on a currently displayed page or its configuration, i.e., type of field (whether it is, e.g., a hotlink, select button or other type user entry field) or location with respect to other such fields to reflect any corresponding positional and/or associated configuration sensitivities.

As one can now appreciate, a sizable group of conditional transition probabilities can be defined to encompass any or all possible user interactions with a currently display web page and the browser, given its present state. In general, these probabilities can be determined through a hand-crafted Bayesian network using data from appropriately instrumented browsers or through a Bayesian model that adapts itself to user interactivity.

Increasingly sophisticated transition probabilities can be conditioned on illustratively: a type of link, e.g., on a current page, in situ, in a toolbar, displayed on a list, displayed in a preview or collaborative filtering window; on page content itself, such as, e.g., if a window contained search results, then on relevancy measures returned by a search engine for each such result that a user can select, and/or a result appearing in a summary or tag field; or, simplistically speaking, a keyword contained in page content itself or in a description, summary, tag or other field associated with the page that matches a keyword in a page previously selected by the user during a current session or within a given prior interval of time; and/or a content similarity, such as, e.g., through a similarity measure, as inferred and returned by a search engine if a user is searching for information, between a current page on which the user is dwelling and each page which the user is pursuing. As discussed above, these transition probabilities can also account for duration of an interval of time during which the user dwells on a current page, actual scroll activity on that page and even current mouse position on the page.

With this in mind, at a high level of sophistication, transition probabilities can be formed through a Bayesian network which predicts future user interest, hence future pages to prefetch, based on user interaction such as that noted above, taken alone or in conjunction with content, e.g., particular words, contained within a currently rendered page or series of previously fetched pages. For further insight into such a Bayesian network, though in the context of an automated user help facility, the reader is referred to pending U.S. patent application entitled "Intelligent User Assistance Facility" filed Jul. 19, 1996, assigned Ser. No. 08/684,003, now U.S. Pat. No. 6,021,403; which is assigned to the present assignee hereof and is also incorporated by reference herein.

At an increasingly higher level of sophistication, transition probabilities can also be conditioned to account for the current search context of the user. Such context includes, for example, states such as "I am just browsing", "I am seeking out specific information and have just performed a search", "I am seeking information but have not performed a search", "I was seeking out information but I am now browsing" and so forth. Browsing without seeking specific information, i.e., without an informational goal, implies, with a higher likelihood, that these goals are shifting as the user reviews additional information from successive pages rather than being driven by a specific informational need. Alternatively, browsing with a goal, as implied by such context variables as a recent search having been requested, implies that the user is focused on finding specific information; hence, these goals are less apt to change as additional content is reviewed. These goals can be ascertained either by inference from the interactions of a user with the browser and/or a web page, and/or by directly querying the user.

User models can be bolstered by developing models that, in addition to the distinctions mentioned, explicitly attempt to model a user's focus of attention as a function of mouse position, scroll of pages, and dwell on information. Such reasoning about current and future focus of attention and consideration of a user's transition to future URLs as function of users' current and future focus of attention can be learned in the laboratory by doing studies of the relationship of attention as approximated by users' gaze with eye tracking machinery. General models of attention learned from such studies can be used to capture a typical user's focus of attention given such information as a probability of the current task or informational goal, as well as pattern of scroll/dwell and mouse cursor positioning. Currently, these patterns can be determined through empirical laboratory studies of multiple subjects through use of, e.g., an infrared corneal reflection system (such as an ASL E4000 IR system manufactured by Applied Sciences Laboratories) to track gaze. The prohibitive cost of presently available eye-tracking systems necessitates that eye-tracking methodology is best used in a laboratory setting to discern statistical relationships among patterns of observable evidence (that can be observed at run-time without eye-tracking) and actual gaze. Such statistical relationships can be used in real-time to bolster models of current attention and transition to future URLs without requiring real-time eye tracking. However, in the near future, with the ever decreasing cost of computing equipment and video cameras, I expect that personal computers, such as computer system 10, and particularly those directed to the consumer market, may be supplied with effective, though relatively inexpensive, video cameras, such as CCD (charge-coupled device) imagers—symbolized by camera 514 in FIG. 5, and associated hardware, coupled with vision techniques through which accurate gaze detection will be practical.

Nevertheless, in the meantime, appropriate surrogates for actual gaze detection can be used in a personal computer instead of real-time data. Such surrogates would provide sufficiently robust statistical models that provide p(Gaze Position|Evidence) with respect to variables of interest (i.e., a set of evidence) that would actually be measured at run-time.

In particular, to form such a surrogate, patterns of actual real-time eye movement of a user viewing a displayed page are first tracked and analyzed in a laboratory setting for individuals within a sufficiently large user community. Resulting measurements are then statistically analyzed, with respect to a predefined set of evidence, to yield a sufficiently robust statistical model of gaze as a function of the variables of interest that will be measured at run-time. The model would provide values of p(Gaze Position|Evidence) and p(next URL(s) selected|Gaze Position, Evidence), such that p(URL(s)|Evidence) can be computed, later at run-time, as simply a product of the two former probabilities. These variables of interest may include user behavior in terms of mouse movement and position, scroll and the like, user age, page content and context, and so forth. This statistical model, taking into account likely patterns of gaze, would yield, later at run-time, probability that a user will be looking at a particular point on a rendered page as a function of items then displayed on that page, e.g., specific contents, link placement, link appearance, page layout and so forth, as well as of position of a mouse pointer and dwell of a mouse pointer given its location, and user scroll through the page.

The resulting probabilities generated through the surrogate can be used to extend a Bayesian model so as to further refine the conditional transition probabilities, based on expected user gaze, and prefetch pages accordingly. Such surrogates can be utilized until such time as real-time user gaze becomes cost effective to measure in a consumer personal computer. Consequently, the transition probabilities would account for actual real-time user behavior that is currently practical to cost-effectively measure, such as, e.g., mouse pointer position and movement, scroll, recent URL accesses, and so forth, along with statistical predictive models that provide surrogates of user behavioral distinctions, such as gaze patterns, that are presently impractical to measure in real-time.

F. Server vis-à-vis client activity

Rather than maintaining and employing the user model, predicting page transitions and prefetching URLs all at the client computer, as is the case with browser 35 shown in FIG. 6, some or all of this activity can occur within the server itself. In particular, the server can store a profile for each user, who were to visit its associated web site, of his(her) conditional page transition probabilities for pages furnished by that site. However, for servers handling rather large user communities, storing such profiles is rather wasteful of storage space. Alternatively, such servers, which generally store log data, can easily process this data to yield generalized statistical log files as user models. As discussed above, based on log usage data, and given a current request for a page from a user download or a set or sequence of pages that have been downloaded by a user, the server can then download not just that page that was most recently and explicitly requested but also a list of URLs and their corresponding likelihoods, or a set of pages or portion(s) of each page in the set or selected page(s) therein that are likely to be requested next from the same server. The browser executing at the client computer can then make decisions about this information including prioritizing the prefetching of new pages based on such a list. Such information can be simply forwarded to the client as hidden "metadata" embedded in the source material for the page that was explicitly requested by the user. As each page is downloaded and cached at the client, the browser could also provide an appropriate prefetch indication, in any of the manners described above, to inform the user that this page is locally cached.

Figure 16:
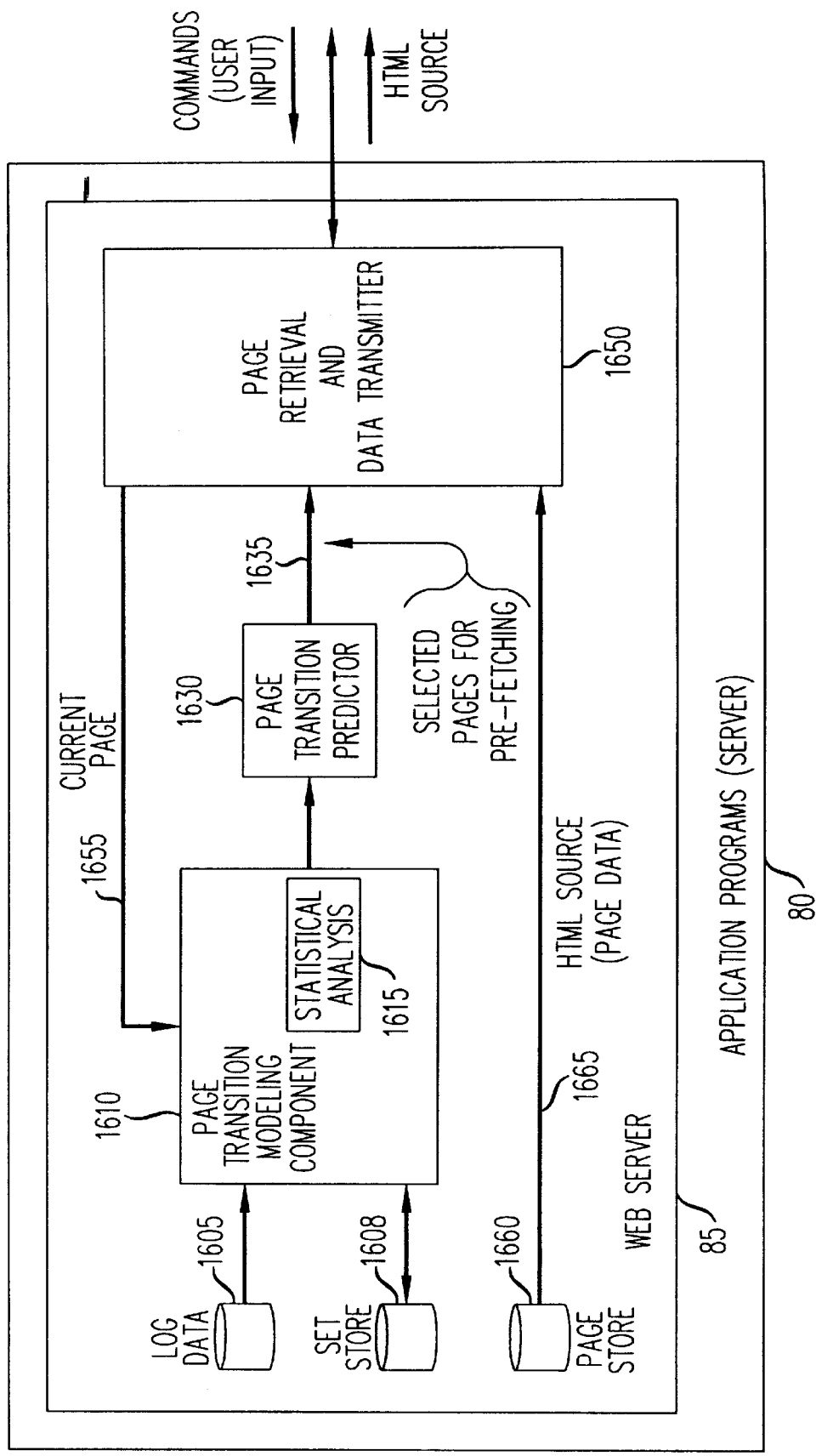
FIG. 16 depicts a high-level block diagram of those portions of application programs 80, specifically web server 85, that execute within server computer 60 shown in FIG. 1 and collectively implement another embodiment of my present invention.

In this regard, I now turn to FIG. 16 which depicts a high-level block diagram of those portions of application programs 80, specifically web server 85, that execute within server computer 60 shown in FIG. 1 and collectively implement this embodiment of my present invention.

As depicted, web server 85, forming a part of application programs 80, includes log data 1605, set store 1608, page transition modeling component 1610, page transition detector 1630, and page retrieval and data transmitter 1650. Page transition modeling component 1610 statistically analyzes log data 1605, through conventional statistical analysis 1615, to determine, for each separate web page stored in page store 1660 and accessible through the web server, a corresponding set of URLs ordered by their likelihood of being accessed next. All such resulting sets are stored on set store 1608. Assuming that a user is viewing one of the web pages in page store 1660, the corresponding set will contain a URL for each of those pages to which the user, within a predefined probability, is likely to next transition. As discussed above in conjunction with FIG. 14 with MSNBC site data, for each page stored within page store 1660, its corresponding set of URLs may, for a hit fraction of 0.5, illustratively contains 15 different URLs rank ordered by the likelihood of being accessed next. As more page "hits" to web server 85 are recorded in log data 1605, statistical analysis 1615 periodically updates the sets on set store 1608 to statistically and aggregately reflect behavior of the user community as it then exists. As additional pages are created and stored within page store 1660, component 1615 establishes a corresponding set of rank ordered URLs for those pages and stores that set within set store 1608.

When a command (or other user input), from a client computer, requesting a given web page is transmitted over network 50 (see FIG. 1) and is received by server 60, web server 85 directs that command to page retrieval and data transmitter 1650 (shown in FIG. 16). Component 1650 retrieves, as symbolized by line 1665, a file for the requested web page from page store 1660 and transmits that file onto the network for carriage back to the client computer. In addition, component 1650 also supplies, as symbolized by line 1655, the URL for this page to page transition modeling component 1610. In response to this particular URL, component 1610 accesses the corresponding set of rank ordered URLs from set store 1608 and routes, as symbolized by line 1635, that set to page transition predictor 1630. The predictor then selects the specific pages to be prefetched and in what order from this set. This selection may simply include all or a subset, e.g., the most likely m out of n URLs, of the URLs in the set. In response to the selected URLs, component 1650 retrieves the files for each of these URLs in succession from page store 1660 and transmits those files, via network 50 (see FIG. 1), back to the client computer.

As noted above, web server 85 can also store user profiles within store 1608. Rather than performing statistical analysis on log data across an aggregate user community, component 1610, in response to a URL from a user access for a currently accessed page, could, given an address for the user as supplied by the client computer, retrieve a stored profile for that user. The profile would specify which pages the user has accessed and the paths thereamong which the user has taken. Based on the retrieved profile, component 1610 would then construct a probabilistic user model for this specific user. In this case, the transition probabilities and corresponding URLs would be supplied to page transition predictor 1630 which, based on these probabilities, would provide a ordered list of a predefined number of URLs rank ordered by the likelihood of next being accessed by the user to component 1650 for subsequent retrieval in succession and successive downloading to the client computer. Server 85 would perform this processing and downloading during periods of low processing activity and low network usage in order to effectively utilize available processing and network capacity that would otherwise be wasted. Store 1608 could store both user profiles and URL sets based on statistical usage log data. In this case, web server 85 could utilize a URL set as a default in the event a stored profile is not available for a given user or if that user could not be adequately identified as would arise if the user were to access web server 85 through a proxy server.

As is the case noted above with shifting available computational resources from one task instance to another, costs arise in prefetching a particular web page (or portion of that page). Such costs, such as necessary network or processing time, can influence decisions about whether to prefetch that particular page (or portion) over prefetching another such page or portion. As discussed above in the context of task switching, available resources, i.e., processing time and network time, should only be expended in prefetching a particular web page (or portion of that page) if the expected benefit flowing therefrom will exceed the costs of prefetching it. Hence, given a current page being accessed, if the expected benefit associated with prefetching a page then having the highest flux-probability product were less, by virtue of higher costs, than that of prefetching a page having the next highest flux-probability product, then the latter page should be prefetched over the former page. Hence, any one page (or portion) would only be prefetched over another page if the expected benefit of the former, in view of the costs of doing so, were to exceed the expected benefit of prefetching that other page (or portion).

Furthermore, a client computer should continue to prefetch available pages as long as the benefit resulting from doing so were to exceed the benefit of performing any other future or current task instance then pending, if any, in view of the costs of switching to that instance.

Moreover, the expected benefit flowing from prefetching and storing a web page for subsequent access, could exceed a benefit currently accruing from a presently executing task instance, even in view of the cost of terminating the latter in favor of the performing the former. In this case, I believe that an optimal use of available computer resources would arise if a presently executing task instance in the client computer were to be terminated in favor of prefetching the page, hence trading off continued processing of a presently executing task in favor of processing a future task instance, here prefetching and storage of that page.

Although various illustrative embodiments which incorporate the teachings of the present invention have been shown and described in detail herein, those skilled in the art can readily devise many other embodiments that still utilize these teachings.

I claim:

1. In a computer system that, in response to user interaction with the system, requests items of information, as desired by a user, from a source accessible by the system, a method of obtaining the items of information comprising the steps of:

accessing, in response to a request from the user, a first item of information from the source and rendering the first item so accessed to the user;

determining a second item of information in response to a predefined aspect of the first item and a predefined user model; and while the first item is being so rendered:

prefetching the second item from the source and storing the second item so obtained in a memory, for subsequent access, in the event of a request for said access from the user;

providing an indication to the user that the second item has been prefetched, wherein the indication comprises changing a formatting attribute of a displayed link associated with the second item, or providing, through a graphical user interface, a corresponding predefined visual perceptible feature, visual attribute or visual cue; and changing the indication to reflect a period of time during which the second item remains stored in the memory for subsequent access.

2. The method of claim 1 further comprising the step of purging the second item from memory in the event the user does not access the second item within a predefined interval of time occurring after the second item was prefetched and stored.

3. A computer readable medium having computer executable instructions stored therein for performing the steps of claim 1.

4. Apparatus for a client computer system that, in response to user interaction with the system, requests items of information, as desired by a user, from a source accessible by the system, wherein the client computer comprises:

a processor;

a memory having computer executable instructions stored therein;

wherein, in response to the stored instructions, the processor:

accesses, in response to a request from the user, a first item of information from the source and rendering the first item so accessed to the user;

determines a second item of information in response to a predefined aspect of the first item and a predefined user model; and while the first item is being so rendered:

prefetches the second item from the source and storing the second item so obtained in the memory, for subsequent access, in the event of a request for said access from the user;

provides an indication to the user that the second item has been prefetched, wherein the indication comprises changing a formatting attribute of a displayed link associated with the second item, or providing, through a graphical user interface, a corresponding predefined visual perceptible feature, visual attribute or visual cue; and changes the indication to reflect a period of time during which the second item remains stored in the memory for subsequent access.

5. The apparatus of claim 4 wherein the processor, in response to the stored instructions, purges the second item from memory in the event the user does not access the second item within a predefined interval of time occurring after the second item was prefetched and stored.

* * * * *